US008570988B2

(12) United States Patent
Wallace et al.

(10) Patent No.: US 8,570,988 B2
(45) Date of Patent: *Oct. 29, 2013

(54) CHANNEL CALIBRATION FOR A TIME DIVISION DUPLEXED COMMUNICATION SYSTEM

(75) Inventors: Mark S. Wallace, Bedford, MA (US); John W. Ketchum, Harvard, MA (US); J. Rodney Walton, Carlisle, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/045,781

(22) Filed: Jan. 27, 2005

(65) Prior Publication Data

US 2005/0128953 A1 Jun. 16, 2005

Related U.S. Application Data

(63) Continuation-in-part of application No. 10/693,169, filed on Oct. 23, 2003.

(60) Provisional application No. 60/421,462, filed on Oct. 25, 2002, provisional application No. 60/421,309, filed on Oct. 25, 2002.

(51) Int. Cl.
*H04B 7/00* (2006.01)
*H04L 29/02* (2006.01)

(52) U.S. Cl.
USPC ............ 370/338; 370/328; 370/336; 455/132

(58) Field of Classification Search
USPC ............... 370/310–350, 442; 455/422.1–460, 455/500–528, 68–72, 67.11–67.16, 77–88
See application file for complete search history.

(56) References Cited

U.S. PATENT DOCUMENTS

| 4,736,371 A | 4/1988 | Tejima et al. |
| 4,750,198 A | 6/1988 | Harper |

(Continued)

FOREIGN PATENT DOCUMENTS

| AU | 2002259221 | 11/2002 |
| CA | 2690245 A1 | 10/2001 |

(Continued)

OTHER PUBLICATIONS

L. Deneire, et al. "A Low Complexity ML Channel Estimator for OFDM," Proc IEEE ICC Jun. 2001, pp. 1461-1465.

(Continued)

*Primary Examiner* — Marsha D Banks Harold
*Assistant Examiner* — Matthew Campbell
(74) *Attorney, Agent, or Firm* — QUALCOMM IP Department; James Hunt Yancey, Jr.

(57) ABSTRACT

Techniques are described to calibrate the downlink and uplink channels to account for differences in the frequency responses of the transmit and receive chains at an access point and a user terminal. In one method, pilots are transmitted on the downlink and uplink channels and used to derive estimates of the downlink and uplink channel responses, respectively. Correction factors for the access point and correction factors for the user terminal are determined based on (e.g., by performing matrix-ratio computation or minimum mean square error (MMSE) computation on) the downlink and uplink channel response estimates. The correction factors for the access point and the correction factors for the user terminal are used to obtain a calibrated downlink channel and a calibrated uplink channel, which are transpose of one another. The calibration may be performed in real time based on over-the-air transmission.

33 Claims, 8 Drawing Sheets

(56) References Cited

U.S. PATENT DOCUMENTS

| | | |
|---|---|---|
| 4,797,879 A | 1/1989 | Habbab et al. |
| 5,239,677 A | 8/1993 | Jasinski |
| 5,241,544 A | 8/1993 | Jasper et al. |
| 5,295,159 A | 3/1994 | Kerpez |
| 5,404,355 A | 4/1995 | Raith |
| 5,422,733 A | 6/1995 | Merchant et al. |
| 5,471,647 A | 11/1995 | Gerlach et al. |
| 5,479,447 A | 12/1995 | Chow et al. |
| 5,491,837 A | 2/1996 | Haartsen |
| 5,493,712 A | 2/1996 | Ramesh et al. |
| 5,506,861 A | 4/1996 | Bottomley |
| 5,509,003 A | 4/1996 | Snijders et al. |
| 5,606,729 A | 2/1997 | D'amico |
| 5,638,369 A | 6/1997 | Ayerst et al. |
| 5,677,909 A | 10/1997 | Heide |
| 5,729,542 A | 3/1998 | Dupont |
| 5,790,550 A | 8/1998 | Peeters et al. |
| 5,818,813 A | 10/1998 | Saito et al. |
| 5,822,374 A | 10/1998 | Levin |
| 5,832,387 A | 11/1998 | Bae et al. |
| 5,859,875 A | 1/1999 | Kato et al. |
| 5,867,478 A | 2/1999 | Baum et al. |
| 5,867,539 A | 2/1999 | Koslov |
| 5,883,887 A | 3/1999 | Take et al. |
| 5,886,988 A | 3/1999 | Yun et al. |
| 5,959,965 A | 9/1999 | Ohkubo et al. |
| 5,973,638 A | 10/1999 | Robbins et al. |
| 5,982,327 A | 11/1999 | Vook et al. |
| 6,005,876 A | 12/1999 | Cimini, Jr. et al. |
| 6,011,963 A | 1/2000 | Ogoro |
| 6,049,548 A | 4/2000 | Bruno et al. |
| 6,067,290 A | 5/2000 | Paulraj et al. |
| 6,072,779 A | 6/2000 | Tzannes et al. |
| 6,084,915 A | 7/2000 | Williams |
| 6,097,771 A | 8/2000 | Foschini |
| 6,115,354 A | 9/2000 | Weck |
| 6,122,247 A | 9/2000 | Levin et al. |
| 6,131,016 A | 10/2000 | Greenstein et al. |
| 6,141,388 A | 10/2000 | Servais et al. |
| 6,141,542 A | 10/2000 | Kotzin et al. |
| 6,141,567 A | 10/2000 | Youssefmir et al. |
| 6,144,711 A * | 11/2000 | Raleigh et al. ........... 375/347 |
| 6,163,296 A * | 12/2000 | Lier et al. ............... 342/417 |
| 6,167,031 A | 12/2000 | Olofsson et al. |
| 6,178,196 B1 | 1/2001 | Naguib et al. |
| 6,192,256 B1 | 2/2001 | Whinnett |
| 6,205,410 B1 | 3/2001 | Cai |
| 6,222,888 B1 | 4/2001 | Kao et al. |
| 6,232,918 B1 * | 5/2001 | Wax et al. ............... 342/360 |
| 6,266,528 B1 | 7/2001 | Farzaneh |
| 6,275,543 B1 | 8/2001 | Petrus et al. |
| 6,278,726 B1 | 8/2001 | Mesecher et al. |
| 6,292,917 B1 | 9/2001 | Sinha et al. |
| 6,298,035 B1 | 10/2001 | Heiskala |
| 6,298,092 B1 | 10/2001 | Heath, Jr. et al. |
| 6,308,080 B1 | 10/2001 | Burt et al. |
| 6,314,113 B1 | 11/2001 | Guemas |
| 6,314,289 B1 | 11/2001 | Eberlein et al. |
| 6,317,612 B1 | 11/2001 | Farsakh |
| 6,330,277 B1 | 12/2001 | Gelblum et al. |
| 6,330,293 B1 | 12/2001 | Klank et al. |
| 6,330,462 B1 | 12/2001 | Chen |
| 6,333,953 B1 | 12/2001 | Bottomley et al. |
| 6,339,399 B1 * | 1/2002 | Andersson et al. ....... 342/372 |
| 6,345,036 B1 | 2/2002 | Sudo et al. |
| 6,346,910 B1 * | 2/2002 | Ito ........................... 342/174 |
| 6,351,499 B1 | 2/2002 | Paulraj et al. |
| 6,363,267 B1 | 3/2002 | Lindskog et al. |
| 6,369,758 B1 | 4/2002 | Zhang |
| 6,377,812 B1 | 4/2002 | Rashid-Farrokhi et al. |
| 6,385,264 B1 | 5/2002 | Terasawa et al. |
| 6,426,971 B1 | 7/2002 | Wu et al. |
| 6,452,981 B1 | 9/2002 | Raleigh et al. |
| 6,463,290 B1 | 10/2002 | Stilp et al. |
| 6,473,467 B1 | 10/2002 | Wallace et al. |
| 6,478,422 B1 | 11/2002 | Hansen |
| 6,492,942 B1 | 12/2002 | Kezys |
| 6,510,184 B1 | 1/2003 | Okamura |
| 6,515,617 B1 | 2/2003 | Demers et al. |
| 6,532,225 B1 | 3/2003 | Chang et al. |
| 6,532,255 B1 | 3/2003 | Gunzelmann et al. |
| 6,532,562 B1 | 3/2003 | Chou et al. |
| 6,545,997 B1 | 4/2003 | Bohnke et al. |
| 6,574,211 B2 | 6/2003 | Padovani et al. |
| 6,574,267 B1 | 6/2003 | Kanterakis et al. |
| 6,574,271 B2 | 6/2003 | Mesecher et al. |
| 6,594,473 B1 | 7/2003 | Dabak et al. |
| 6,594,798 B1 | 7/2003 | Chou et al. |
| 6,597,682 B1 | 7/2003 | Kari |
| 6,608,874 B1 | 8/2003 | Beidas et al. |
| 6,611,231 B2 | 8/2003 | Crilly, Jr. et al. |
| 6,631,121 B1 | 10/2003 | Yoon |
| 6,636,496 B1 | 10/2003 | Cho et al. |
| 6,636,568 B2 | 10/2003 | Kadous |
| 6,654,590 B2 | 11/2003 | Boros et al. |
| 6,654,613 B1 | 11/2003 | Maeng et al. |
| 6,668,161 B2 * | 12/2003 | Boros et al. ............... 370/310 |
| 6,683,916 B1 | 1/2004 | Sartori et al. |
| 6,690,660 B2 | 2/2004 | Kim et al. |
| 6,693,992 B2 | 2/2004 | Jones et al. |
| 6,697,346 B1 | 2/2004 | Halton et al. |
| 6,711,121 B1 | 3/2004 | Gerakoulis et al. |
| 6,728,233 B1 | 4/2004 | Park et al. |
| 6,731,668 B2 | 5/2004 | Ketchum |
| 6,735,188 B1 | 5/2004 | Becker et al. |
| 6,738,020 B1 | 5/2004 | Lindskog et al. |
| 6,744,811 B1 | 6/2004 | Kantschuk |
| 6,751,187 B2 | 6/2004 | Walton et al. |
| 6,751,444 B1 | 6/2004 | Meiyappan |
| 6,751,480 B2 | 6/2004 | Kogiantis et al. |
| 6,757,263 B1 | 6/2004 | Olds |
| 6,760,313 B1 | 7/2004 | Sindhushayana et al. |
| 6,760,388 B2 | 7/2004 | Ketchum et al. |
| 6,760,882 B1 | 7/2004 | Gesbert et al. |
| 6,768,727 B1 | 7/2004 | Sourour et al. |
| 6,771,706 B2 | 8/2004 | Ling et al. |
| 6,785,341 B2 | 8/2004 | Walton et al. |
| 6,785,513 B1 | 8/2004 | Sivaprakasam |
| 6,792,041 B1 | 9/2004 | Kim et al. |
| 6,795,424 B1 | 9/2004 | Kapoor et al. |
| 6,798,738 B1 | 9/2004 | Do et al. |
| 6,801,790 B2 | 10/2004 | Rudrapatna |
| 6,802,035 B2 | 10/2004 | Catreux et al. |
| 6,804,191 B2 | 10/2004 | Richardson |
| 6,821,535 B2 | 11/2004 | Nurmi et al. |
| 6,842,460 B1 | 1/2005 | Olkkonen et al. |
| 6,847,828 B2 | 1/2005 | Miyoshi et al. |
| 6,850,252 B1 | 2/2005 | Hoffberg |
| 6,850,498 B2 | 2/2005 | Heath et al. |
| 6,859,503 B2 | 2/2005 | Pautler et al. |
| 6,862,271 B2 | 3/2005 | Medvedev et al. |
| 6,862,440 B2 | 3/2005 | Sampath |
| 6,868,079 B1 | 3/2005 | Hunt |
| 6,873,651 B2 | 3/2005 | Tesfai et al. |
| 6,879,578 B2 | 4/2005 | Pan et al. |
| 6,879,579 B1 | 4/2005 | Myles et al. |
| 6,885,708 B2 | 4/2005 | Thomas et al. |
| 6,888,809 B1 | 5/2005 | Foschini et al. |
| 6,888,899 B2 | 5/2005 | Raleigh et al. |
| 6,891,858 B1 | 5/2005 | Mahesh et al. |
| 6,920,192 B1 | 7/2005 | Laroia et al. |
| 6,920,194 B2 | 7/2005 | Stopler et al. |
| 6,927,728 B2 | 8/2005 | Vook et al. |
| 6,937,592 B1 | 8/2005 | Heath, Jr. et al. |
| 6,940,917 B2 | 9/2005 | Menon et al. |
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 | 10/2005 | Fukuda |
| 6,956,906 B2 | 10/2005 | Tager et al. |
| 6,959,171 B2 | 10/2005 | Tsien et al. |
| 6,963,742 B2 | 11/2005 | Boros et al. |
| 6,965,762 B2 | 11/2005 | Sugar et al. |
| 6,980,601 B2 | 12/2005 | Jones |

(56) References Cited

U.S. PATENT DOCUMENTS

| | | |
|---|---|---|
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent |
| 7,002,900 B2 | 2/2006 | Walton et al. |
| 7,003,044 B2 | 2/2006 | Subramanian et al. |
| 7,006,464 B1 | 2/2006 | Gopalakrishnan et al. |
| 7,006,483 B2 | 2/2006 | Nelson, Jr. et al. |
| 7,006,848 B2 | 2/2006 | Ling et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,482 B2 | 3/2006 | Medvedev et al. |
| 7,020,490 B2 | 3/2006 | Khatri |
| 7,023,826 B2 | 4/2006 | Sjoberg et al. |
| 7,024,163 B1 | 4/2006 | Barratt et al. |
| 7,031,671 B2 | 4/2006 | Mottier |
| 7,035,359 B2 | 4/2006 | Molnar |
| 7,039,125 B2 | 5/2006 | Friedman |
| 7,042,858 B1 | 5/2006 | Ma et al. |
| 7,054,378 B2 | 5/2006 | Walton et al. |
| 7,058,367 B1 | 6/2006 | Luo et al. |
| 7,062,294 B1 | 6/2006 | Rogard et al. |
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 | 7/2006 | Walton et al. |
| 7,088,671 B1 | 8/2006 | Monsen |
| 7,095,709 B2 | 8/2006 | Walton et al. |
| 7,095,722 B1 | 8/2006 | Walke et al. |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 * | 9/2006 | Nafie et al. .................. 370/349 |
| 7,116,652 B2 | 10/2006 | Lozano |
| 7,120,199 B2 | 10/2006 | Thielecke et al. |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,239 B2 | 12/2006 | Hudson |
| 7,149,254 B2 | 12/2006 | Sampath |
| 7,151,809 B2 | 12/2006 | Ketchum et al. |
| 7,155,171 B2 | 12/2006 | Ebet et al. |
| 7,158,563 B2 | 1/2007 | Ginis et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,221,956 B2 | 5/2007 | Medvedev et al. |
| 7,224,704 B2 | 5/2007 | Lu et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 * | 7/2007 | Agee et al. .................. 455/101 |
| 7,254,171 B2 | 8/2007 | Hudson |
| 7,260,153 B2 | 8/2007 | Nissani et al. |
| 7,260,366 B2 | 8/2007 | Lee et al. |
| 7,263,119 B1 | 8/2007 | Hsu et al. |
| 7,274,734 B2 | 9/2007 | Tsatsanis |
| 7,280,467 B2 | 10/2007 | Smee et al. |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 * | 12/2007 | Mody et al. .................. 370/208 |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 * | 9/2008 | Malaender et al. ........... 370/334 |
| 7,453,844 B1 | 11/2008 | Lee et al. |
| 7,466,749 B2 | 12/2008 | Medvedev et al. |
| 7,480,278 B2 | 1/2009 | Pedersen et al. |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | Du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,636,573 B2 | 12/2009 | Walton et al. |
| 7,653,142 B2 | 1/2010 | Ketchum et al. |
| 7,653,415 B2 | 1/2010 | Van Rooyen |
| 7,822,140 B2 | 10/2010 | Catreux et al. |
| 8,145,179 B2 | 3/2012 | Walton et al. |
| 8,170,513 B2 | 5/2012 | Walton et al. |
| 8,254,246 B2 | 8/2012 | Ma et al. |
| 8,325,836 B2 | 12/2012 | Tong et al. |
| 8,358,714 B2 | 1/2013 | Walton et al. |
| 8,406,118 B2 | 3/2013 | Ma et al. |
| 8,462,643 B2 | 6/2013 | Walton et al. |
| 2001/0017881 A1 | 8/2001 | Bhatoolaul et al. |
| 2001/0031621 A1 | 10/2001 | Schmutz |
| 2001/0046205 A1 | 11/2001 | Easton et al. |
| 2001/0048675 A1 | 12/2001 | Nafie et al. |
| 2002/0003774 A1 | 1/2002 | Wang et al. |
| 2002/0004920 A1 | 1/2002 | Cho et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0072336 A1 | 6/2002 | Mottier |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0127978 A1 | 9/2002 | Khatri |
| 2002/0154705 A1 | 10/2002 | Walton et al. |
| 2002/0155818 A1 * | 10/2002 | Boros et al. .................. 455/67.4 |
| 2002/0181390 A1 * | 12/2002 | Mody et al. .................. 370/208 |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0003863 A1 | 1/2003 | Thielecke et al. |
| 2003/0012308 A1 | 1/2003 | Sampath et al. |
| 2003/0039317 A1 | 2/2003 | Taylor et al. |
| 2003/0045288 A1 | 3/2003 | Luschi et al. |

(56) References Cited

U.S. PATENT DOCUMENTS

| | | |
|---|---|---|
| 2003/0048856 A1 | 3/2003 | Ketchum et al. |
| 2003/0064739 A1* | 4/2003 | Lindskog et al. ............ 455/504 |
| 2003/0076812 A1 | 4/2003 | Benedittis |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0103584 A1 | 6/2003 | Bjerke et al. |
| 2003/0112745 A1 | 6/2003 | Zhuang et al. |
| 2003/0119452 A1 | 6/2003 | Kim et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0142732 A1 | 7/2003 | Moshavi et al. |
| 2003/0153360 A1 | 8/2003 | Burke et al. |
| 2003/0157954 A1 | 8/2003 | Medvedev et al. |
| 2003/0162519 A1 | 8/2003 | Smith et al. |
| 2003/0185311 A1 | 10/2003 | Kim |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0223391 A1* | 12/2003 | Malaender et al. ............ 370/334 |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0017785 A1 | 1/2004 | Zelst |
| 2004/0037257 A1 | 2/2004 | Ngo |
| 2004/0042556 A1 | 3/2004 | Medvedev et al. |
| 2004/0052228 A1 | 3/2004 | Tellado et al. |
| 2004/0062192 A1 | 4/2004 | Liu et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0081131 A1 | 4/2004 | Walton et al. |
| 2004/0082356 A1 | 4/2004 | Walton et al. |
| 2004/0085939 A1 | 5/2004 | Wallace et al. |
| 2004/0095907 A1* | 5/2004 | Agee et al. ..................... 370/334 |
| 2004/0120411 A1 | 6/2004 | Walton et al. |
| 2004/0136349 A1 | 7/2004 | Walton et al. |
| 2004/0151108 A1 | 8/2004 | Blasco Claret et al. |
| 2004/0151122 A1 | 8/2004 | Lau et al. |
| 2004/0156328 A1 | 8/2004 | Walton et al. |
| 2004/0160987 A1 | 8/2004 | Sudo et al. |
| 2004/0176097 A1 | 9/2004 | Wilson et al. |
| 2004/0179627 A1 | 9/2004 | Ketchum et al. |
| 2004/0184398 A1 | 9/2004 | Walton et al. |
| 2004/0198276 A1 | 10/2004 | Tellado et al. |
| 2004/0203853 A1 | 10/2004 | Sheynblat |
| 2004/0252632 A1 | 12/2004 | Bourdoux et al. |
| 2005/0047384 A1* | 3/2005 | Wax et al. ..................... 370/338 |
| 2005/0047515 A1 | 3/2005 | Walton et al. |
| 2005/0099974 A1 | 5/2005 | Kats et al. |
| 2005/0111599 A1 | 5/2005 | Walton et al. |
| 2005/0120097 A1 | 6/2005 | Walton et al. |
| 2005/0124297 A1* | 6/2005 | Eilts et al. ................... 455/67.11 |
| 2005/0135284 A1 | 6/2005 | Nanda et al. |
| 2005/0135295 A1 | 6/2005 | Walton et al. |
| 2005/0135318 A1 | 6/2005 | Walton et al. |
| 2005/0147177 A1 | 7/2005 | Seo et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0227628 A1 | 10/2005 | Inanoglu |
| 2005/0276343 A1 | 12/2005 | Jones |
| 2006/0018247 A1 | 1/2006 | Driesen et al. |
| 2006/0018395 A1 | 1/2006 | Tzannes |
| 2006/0039275 A1 | 2/2006 | Walton et al. |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0177681 A1 | 8/2007 | Choi et al. |
| 2007/0274278 A1 | 11/2007 | Choi et al. |
| 2008/0069015 A1 | 3/2008 | Walton et al. |
| 2008/0267098 A1 | 10/2008 | Walton et al. |
| 2008/0267138 A1 | 10/2008 | Walton et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0129454 A1 | 5/2009 | Medvedev et al. |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0260060 A1 | 10/2010 | Abraham et al. |
| 2010/0271930 A1 | 10/2010 | Tong et al. |
| 2011/0235744 A1 | 9/2011 | Ketchum et al. |
| 2012/0140664 A1 | 6/2012 | Walton et al. |
| 2012/0176928 A1 | 7/2012 | Wallace et al. |

FOREIGN PATENT DOCUMENTS

| | | |
|---|---|---|
| CA | 2690247 A1 | 10/2001 |
| CN | 1086061 | 4/1994 |
| CN | 1234661 | 11/1999 |
| CN | 1298266 A | 6/2001 |
| CN | 1314037 A | 9/2001 |
| CN | 1347609 A | 5/2002 |
| CN | 1469662 | 1/2004 |
| CN | 1489836 A | 4/2004 |
| CN | 1537371 | 10/2004 |
| CN | 1308794 | 4/2005 |
| DE | 19951525 | 6/2001 |
| EP | 0755090 A1 | 1/1997 |
| EP | 0762701 A2 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 A2 | 9/2001 |
| EP | 1137217 | 9/2001 |
| EP | 1143754 A1 | 10/2001 |
| EP | 1170879 A1 | 1/2002 |
| EP | 1175022 A2 | 1/2002 |
| EP | 1182799 A2 | 2/2002 |
| EP | 1185001 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 A2 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |

(56) References Cited

FOREIGN PATENT DOCUMENTS

| | | |
|---|---|---|
| JP | 09135230 | 5/1997 |
| JP | 9266466 A | 10/1997 |
| JP | 9307526 A | 11/1997 |
| JP | 09327073 | 12/1997 |
| JP | 9512156 T | 12/1997 |
| JP | 1028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11069431 A | 3/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2991167 | 12/1999 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 A | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504336 A | 2/2006 |
| JP | 2006504372 | 2/2006 |
| KR | 200011799 | 2/2000 |
| KR | 20010098861 | 11/2001 |
| KR | 1020020003370 | 1/2002 |
| KR | 20030085040 | 11/2003 |
| KR | 20060095576 A | 8/2006 |
| RU | 2015281 C1 | 6/1994 |
| RU | 2111619 C1 | 5/1998 |
| RU | 2134489 | 8/1999 |
| RU | 2139633 | 10/1999 |
| RU | 2141168 C1 | 11/1999 |
| RU | 2146418 C1 | 3/2000 |
| RU | 2149509 | 5/2000 |
| RU | 2152132 C1 | 6/2000 |
| RU | 2157592 | 10/2000 |
| RU | 2158479 C2 | 10/2000 |
| RU | 2168278 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 545006 B | 8/2003 |
| TW | 583842 B | 4/2004 |
| TW | I230525 | 4/2005 |
| TW | I263449 | 10/2006 |
| TW | I267251 B | 11/2006 |
| WO | WO8607223 | 12/1986 |
| WO | WO9307684 A1 | 4/1993 |
| WO | WO9507578 | 3/1995 |
| WO | 9521501 A1 | 8/1995 |
| WO | WO9530316 A1 | 11/1995 |
| WO | WO9532567 A1 | 11/1995 |
| WO | WO9622662 A1 | 7/1996 |
| WO | WO9635268 | 11/1996 |
| WO | 9702667 | 1/1997 |
| WO | WO9719525 A1 | 5/1997 |
| WO | WO9736377 A1 | 10/1997 |
| WO | WO9809381 A | 3/1998 |
| WO | WO9809395 | 3/1998 |
| WO | WO9824192 A1 | 6/1998 |
| WO | WO9826523 | 6/1998 |
| WO | WO9830047 A1 | 7/1998 |
| WO | WO9857472 | 12/1998 |
| WO | WO9903224 A1 | 1/1999 |
| WO | WO9914878 | 3/1999 |
| WO | WO9916214 | 4/1999 |
| WO | 9929049 A2 | 6/1999 |
| WO | WO9944379 A1 | 9/1999 |
| WO | 9952224 A1 | 10/1999 |
| WO | 99057820 | 11/1999 |
| WO | WO0011823 A1 | 3/2000 |
| WO | WO0036764 A2 | 6/2000 |
| WO | WO0062456 | 10/2000 |
| WO | WO0105067 A1 | 1/2001 |
| WO | WO0126269 A1 | 4/2001 |
| WO | 0163775 A2 | 8/2001 |
| WO | WO0169801 A2 | 9/2001 |
| WO | WO0171928 | 9/2001 |
| WO | WO0176110 A2 | 10/2001 |
| WO | WO0180510 A1 | 10/2001 |
| WO | WO0182521 A2 | 11/2001 |
| WO | 0195531 A2 | 12/2001 |
| WO | WO0197400 | 12/2001 |
| WO | WO0201732 A2 | 1/2002 |
| WO | WO0203557 A1 | 1/2002 |
| WO | WO0215433 A1 | 2/2002 |
| WO | WO0225853 A2 | 3/2002 |
| WO | WO02060138 A2 | 8/2002 |
| WO | WO02062002 A1 | 8/2002 |
| WO | WO02065664 A2 | 8/2002 |
| WO | WO02069523 A1 | 9/2002 |
| WO | WO02069590 A1 | 9/2002 |
| WO | WO02073869 A1 | 9/2002 |
| WO | WO02075955 | 9/2002 |
| WO | WO02078211 A2 | 10/2002 |
| WO | WO02082689 A2 | 10/2002 |
| WO | WO02088656 | 11/2002 |
| WO | WO02093784 A1 | 11/2002 |
| WO | WO02099992 A1 | 12/2002 |
| WO | WO03010984 A1 | 2/2003 |
| WO | WO03010994 A1 | 2/2003 |
| WO | WO03019984 A1 | 3/2003 |
| WO | WO03028153 A1 | 4/2003 |
| WO | WO03034646 A2 | 4/2003 |
| WO | WO03047140 A1 | 6/2003 |
| WO | WO03075479 | 9/2003 |
| WO | WO2004002011 | 12/2003 |
| WO | WO2004002047 | 12/2003 |
| WO | WO2004038985 A2 | 5/2004 |
| WO | WO2004038986 | 5/2004 |
| WO | WO2004039011 A2 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

International Search Report PCT/US06/003203—International Search Authority—European Patent Office Aug. 29, 2006.

International Search Report PCT/US03/034515—International Search Authority—European Patent Office Jun. 17, 2004.

Written Opinion PCT/US06/003203—International Search Authority—European Patent Office Aug. 29, 2006.

(56) References Cited

OTHER PUBLICATIONS

International Preliminary Report on Patentability PCT/US06/003203—The International Bureau of WIPO, Geneva, Switzerland—Jul. 31, 2007.
3GPP2 TIA/EIS/IS-2000.2-A, "Physical Layer Standard for cdma2000 Spread Spectrum Systems", (Mar. 2000).
Alamouti, S.M., "A Simple Transmit Diversity Technique for Wireless Communications," IEEE Journal on Select Areas in Communications, vol. 16, No. 8, Oct. 1998, pp. 1451-1458.
Chen, K.C. et al., "Novel Space-Time Processing of DS/CDMA Multipath Signal," IEEE 49th, Vehicular Technology Conference, Houston, Texas, May 16-20, 1999, pp. 1809-1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.
Diggavi, S. et al., "Intercarrier interference in MIMO OFDM," IEEE International Conference on Communications, 2002, vol. 1, 485-489.
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
European Search Report—EP09171254, Search Authority—The Hague Patent Office, Sep. 3, 2010.
European Search Report for EP Application No. EP10150225 filed on Feb. 25, 2010.
Fujii, M.: "Pseudo-Orthogonal Multibeam-Time Transmit Diversity for OFDM-CDMA" pp. 222-226 (2002).
Gao, et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, Sep. 24-28, 2002, IEEE Vehicular Technology Conference, pp. 199-203.
Hassibi B., et al., "High Rate Codes That Are Linear in Space and Time," LUCENT Technologies, 2002, pp. 1-55.
Haustein, T. et al.: "Performance of MIMO Systems with Channel Inversion," IEEE 55th Vehicular Technology Conference, Birmingham, Alabama, May 6-9, 2002, pp. 35-39.
Hayashi, K, A New Spatio-Temporal Equalization Method Based On Estimated Channel Response, Sep. 2001, IEEE Transaction on Vehicular Technology, vol. 50, Issue 5, pp. 1250-1259.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Iserte et al., "Joint beamforming strategies in OFDM-MIMO systems," 2002, sections 2 and 3, Department of Signal Theory and Communications.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
John A.C. Bingham, "Multicarrier Modulation for Data Transmission: An Idea Whose Time Has Come", IEEE Communications Magazine, p. 5-14 (May 1990).
Jongren et al., Utilizing Quantized Feedback Information in Orthogonal Space-Time Block Coding, 2000 IEEE Global Telecommunications Conference, 2(4):995-999, Nov. 27, 2000.
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa et al.: "Multi channel adaptive forward error-correction system", Communications, Speech and Vision, IEEE Processings I, vol. 140, Issue 5, Oct. 1993, pp. 357-360, 362.

Lebrun G., et al., "MIMO transmission over a time varying TDD channel using SVD," Electronics Letters, 2001, vol. 37, 1363-1364.
Li et al., "Simplified Channel Estimation for OFDM Systems with Multiple Transmit Antennas," IEEE Transactions on Wireless Communications, Jan. 2002, vol. 1, No. 1, 67-75.
Li, Lihua et al., "A practical space-frequency block coded OFDM scheme for fast fading broadband channels," 2002. The 13th IEEE International Symposium on Personal, Indoor and Mobile Radio communications, vol. 1, Sep. 15-18, 2002. pp. 212-216 vol. 1.
Miyashita K et al: "High data-rate transmission with eigenbeam-space division multiplexing (E-SDM) in a MIMO channel" VTC 2002-Fall. 2002 IEEE 56TH. Vehicular Technology Conference Proceedings. Vancouver, Canada, Sep. 24-28, 2002, IEEE Vehicular Technology Conference, New York, NY: IEEE, US, vol. 1 of 4. Conf. 56, Sep. 24, 2002, pp. 1302-1306, XP010608639.
Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.
Sampath H., et al., "Joint transmit and receive optimization for high data rate wireless communication using multiple antennas, XP010373976," 2002, 215-219.
S.W. Wales, "A mimo technique within the UTRA TDD standard," MIMO: Communications Systems from Concept to Implementations (Ref. No. 2001/175), IEE Seminar on, Dec. 12, 2001, pp. 1-8.
Taiwanese Search Report for Application No. 092129800, TIPO, filed on Apr. 6, 2010.
Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.
Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.
Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14, 2001.
U.S. Appl. No. 60/421,309, filed Oct. 25, 2002 by Qualcomm Incorporated.
U.S. Appl. No. 60/421,428, filed Oct. 25, 2002 by Qualcomm Incorporated.
Van Zelst, a. et al.: "Space Division Multiplexing (SDM) for OFDM Systems," IEEE 51st Vehicular Technology Conference Proceedings, pp. 1070-1074, Tokyo, Japan, May 15-18, 2000.
Warner, W. et al.: "OFDM/FM Frame Synchronization for Mobile Radio Data Communication", IEEE Transactions on Vehicular Technology, Aug. 1993, vol. 42, No. 3, pp. 302-313.
Wolniansky et al, "V-BLAST: An Architecture for Achieving Very High Data Rates over the Rich-Scattering Wireless Channel," Proc. ISSSE-98, 1998, Pisa, Italy, pp. 295-300.
Wong K. K., et al., "Optimizing time and space MIMO antenna system for frequency selective fading channels," 2001, Sections II and III and V, 1396.
Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.
Chung, J. et al: "Multiple antenna systems for 802.16 systems." IEEE 802.16 Broadband Wireless Access Working Group <http://ieee802.org/16>, IEEE 802.16abc-01/31, Sep. 7, 2001, pp. 1-5.
Gore D. A., et al: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, Jun. 5, 2000, pp. 2785-2788. XP001035763. abstract.
Office Action in Canadian application 2501634 corresponding to U.S. Appl. No. 10/610,446, CA2690247 dated Feb. 25, 2011.
The Authoritative Dictionary of IEEE Standards Terms, Seventh Edition, IEEE Press: New York (Dec. 2000), p. 902.

(56) References Cited

OTHER PUBLICATIONS

Translation of Office Action in Japanese application 2005-501688 corresponding to U.S. Appl. No. 10/375,162, JP09135230 dated Feb. 15, 2011.

Wong, Cheong. et al., "Multiuser OFDM with Adaptive Subcarrier, Bit and Power Allocation", Oct. 1999, IEEE Journal on Selected Areas in Communications, vol. 17, No. 10, pp. 1747-1758.

Taiwan Search Report—TW095103565—TIPO—Jan. 12, 2012.

G. Bauch, J. Hagenauer, "Smart Versus Dumb Antennas—Capacities and Fec Performance," IEEE Communications Letters, vol. 6, No. 2, pp. 55-57, Feb. 2002.

Grunheid, R. et al., "Adaptive Modulation and Multiple Access for the Ofdm Transmission Technique," Wireless Personal Communications 13: May 13, 2000, 2000 Kluwer Academic Publishers, pp. 4-13, XP000894156.

Le Goff, S. et al: "Turbo-codes and high spectral efficiency modulation," IEEE International Conference on Communications, 1994. ICC '94, Supercomm/ICC '94, Conference Record, 'Serving Humanity Through Communications.' pp. 645-649, vol. 2, May 1-5, 1994, XP010126658, doi: 10.1109/ICC.1994.368804.

Office Action dated Aug. 13, 2008 for Australian Application Serial No. 2004223374, 2 pages.

Office Action dated Jun. 27, 2008 for Chinese Application Serial No. 200480011307.6, 3 pages.

Partial European Search Report—EP10012069—Search Authority—The Hague—Nov. 29, 2011.

Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI: 10.1109/ACSSC.1996.600812, p. 35, col. 2, paragraph 4 through p. 36, col. 1.

Supplementary European Search Report—EP06759443—Search Authority—Hague—Nov. 24, 2011.

Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.

Wyglinski, Alexander. "Physical Layer Loading Algorithms for Indoor Wireless Multicarrier Systems," Thesis Paper, McGill University, Montreal, Canada, Nov. 2004, p. 109.

3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre; 650, Route des Lucioles; F-06921 Sophia-Antipolis Cedex; France, No. V2.0.0, Dec. 20, 2000, pp. 1-144, XP050400193, [retreived on Dec. 20, 2000], p. 126.

3rd Generation Partnership Project; Technical Specification Group Radio Access Network; Radio Resource Control (RRC); Protocol Specifiation (Release 5), 3GPP Standard; 3GPP TS 25.331, 3rd Generation Partnership Project (3GPP), Mobile Competence Centre; 650, Route des Lucioles; F-06921 Sophia-Antipolis Cedex; France, No. V5.2.0, Sep. 1, 2002, pp. 1-938, XP050367950, pp. 124, 358-370.

"3rd Generation Partnership Project; Technical Specification Group Radio Access 6-18, Network; Physical channels and mapping of 21-24 transport channels onto physical channels (TDD) (Release 5)", 3GPP Standard; 3GPP TS 25.221, 3rd Generation Partnership Project (3GPP), Mobile Competence Centre; 650, Route des Lucioles; F-06921 Sophia-Antipolis Cedex; France, No. V5.2.0, Sep. 1, 2002, pp. 1-97, XP050366967.

Catreux S., et al., "Simulation results for an interference-limited multiple input multiple output cellular system", Global Telecommmunications letters. IEEE: U.S.A. Nov. 2000. vol. 4(11), pp. 334-336.

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Co-pending U.S. Appl. No. 07/624,118, filed Dec. 7, 1990.

European Search Report—EP11155678—Search Authority—Hague—Dec. 11, 2012.

Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.

Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 9780-7803-7147-7.

Louvigne J.C., et al., "Experimental study of a real-time calibration procedure of a CDMA/TDD multiple antenna terminal," IEEE Antennas and Propagation Society International Symposium, 2002 Digest.APS.San Antonio, TX, Jun. 16-21, 2002, vol. 2, Jun. 16, 2002, pp. 644-647, XP010591780, DOI: 10.1109/APS.2002.1016729, ISBN: 978-0-7803-7330-3.

Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA, IEEE, US, Feb. 17, 1998, pp. 37-43, XP010277032, DOI: 10.1109/IZSBC.1998.670242 ISBN: 978-07803-3893-7, pp. 1-2.

Sakaguchi et al, "Comprehensive Calibration for MIMO System", International Symposium on Wireless Personal Multimedia Communications, IEEE, vol. 2, Oct. 27, 2002, pp. 440-443.

Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.

Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA, IEEE Comput. Soc, US, vol. 2, Nov. 2, 1997, pp. 1405-1409, XP010280667, DOI: 10.1109/ACSSC.1997. 679134 ISBN: 978-0-8186-8316-9 * pp. 1,3,5; figures 1,3 *.

Yamamura, T et al., "High Mobility OFDM transmission system by a new channel estimation and ISI cancellation scheme using characteristics of pilot symbol inserted OFDM signal", Vehicular Technology Conference, vol. 1, Sep. 19-22, 1999, pp. 319-323, XP010352958 IEEE, Piscataway, NJ, USA, ISBN: 0-7803-5435-4.

Editor: 3GPP Draft; 3rd Generation Partnership Project (3GPP), Technical Specification Group (TSG) Radio Access Network (RAN); Working Group 4(WG4); base Station conformance and testing, TS 25.141 V0.1.1 (May 1999), R4-99349, Mobile Competence Centre; 650, Route des Lucioles; F-06921 Sophia-Antipolis Cedex; France, vol. RAN WG4, No. Miami; Oct. 24, 2001, XP050166323.

Lal D et al: "A novel MAC layer protocol for space division multiple access in wireless ad hoc networks", Computer Communications and Networks, 2002 Proceedings, Eleventh International Conference on Oct. 14, 2002, pp. 614-619.

Technical Search Report issued by the Taiwan Patent Office for TW Application No. 098143050, dated Aug. 2, 2013.

EPO Communication pursuant to Article 94(3) EPC issued by the European Patent Office for EP Application No. 10174926.5, dated Aug. 1, 2013.

* cited by examiner

US 8,570,988 B2

CHANNEL CALIBRATION FOR A TIME DIVISION DUPLEXED COMMUNICATION SYSTEM

CLAIM OF PRIORITY UNDER 35 U.S.C. §120

This application is a Continuation-In-Part of U.S. application Ser. No. 10/693,169, entitled "Channel Calibration for a Time Division Duplexed Communication System," filed Oct. 23, 2003, pending, which claims the benefit of U.S. Provisional Application Ser. No. 60/421,462, entitled, "Channel Calibration for a Time Division Duplexed Communication System," and U.S. Provisional Application Ser. No. 60/421,309, entitled, "MIMO WLAN System," both of which were filed on Oct. 25, 2002, and all assigned to the assignee hereof and hereby expressly incorporated by reference herein.

BACKGROUND

I. Field

The present invention relates generally to communication, and more specifically to techniques for calibrating downlink and uplink channel responses in a time division duplexed (TDD) communication system.

II. Background

In a wireless communication system, data transmission between an access point and a user terminal occurs over a wireless channel. Depending on the system design, the same or different frequency bands may be used for the downlink and uplink. The downlink (or forward link) refers to the communication link from the access point to the user terminal, and the uplink (or reverse link) refers to the communication link from the user terminal to the access point. If two frequency bands are available, then the downlink and uplink may be allocated separate frequency bands using frequency division duplexing (FDD). If only one frequency band is available, then the downlink and uplink may share the same frequency band using time division duplexing (TDD).

To achieve high performance, it is often necessary to know the frequency response of the wireless channel. For example, the response of the downlink channel may be needed by the access point to perform spatial processing (described below) for downlink data transmission to the user terminal. The downlink channel response may be estimated by the user terminal based on a pilot transmitted by the access point. The user terminal may then send the downlink channel response estimate back to the access point for its use. For this channel estimation scheme, a pilot needs to be transmitted on the downlink and additional delays and resources are incurred to send the channel estimate back to the access point.

For a TDD system with a shared frequency band, the downlink and uplink channel responses may be assumed to be reciprocal of one another. That is, if $\underline{H}$ represents a channel response matrix from antenna array A to antenna array B, then a reciprocal channel implies that the coupling from array B to array A is given by $\underline{H}^T$, where $\underline{H}^T$ denotes the transpose of matrix $\underline{H}$. Thus, for the TDD system, the channel response for one link may be estimated based on a pilot sent on the other link. For example, the uplink channel response may be estimated based on a pilot received via the uplink, and the transpose of the uplink channel response estimate may be used as an estimate of the downlink channel response.

However, the frequency responses of the transmit and receive chains at the access point are typically different from the frequency responses of the transmit and receive chains at the user terminal. In particular, the frequency responses of the transmit and receive chains used for uplink transmission may be different from the frequency responses of the transmit and receive chains used for downlink transmission. The "effective" downlink channel response (which includes the responses of the applicable transmit and receive chains) would then be different from the reciprocal of the effective uplink channel response due to differences in the transmit and receive chains (i.e., the effective channel responses are not reciprocal). If the reciprocal of the channel response estimate obtained for one link is used for spatial processing on the other link, then any difference in the frequency responses of the transmit and receive chains would represent error that, if not determined and accounted for, may degrade performance.

There is, therefore, a need in the art for techniques to calibrate the downlink and uplink channels in a TDD communication system.

SUMMARY

Techniques are provided herein to calibrate the downlink and uplink channels to account for differences in the frequency responses of the transmit and receive chains at an access point and a user terminal. After calibration, an estimate of the channel response obtained for one link may be used to obtain an estimate of the channel response for the other link. This can simplify channel estimation and spatial processing.

In a specific embodiment, a method is provided for calibrating the downlink and uplink channels in a wireless TDD multiple-input multiple-output (MIMO) communication system. In accordance with the method, a pilot is transmitted on the uplink channel and used to derive an estimate of the uplink channel response. A pilot is also transmitted on the downlink channel and used to derive an estimate of the downlink channel response. Correction factors for the access point and correction factors for the user terminal are then determined based on the downlink and uplink channel response estimates. The access point may apply its correction factors on its transmit side, or on its receive side, or on both the transmit and receive sides. The user terminal may also apply its correction factors on its transmit side, or on its receive side, or on both the transmit and receive sides. The responses of the calibrated downlink and uplink channels are approximately reciprocal with the access point applying its correction factors and the user terminal also applying its correction factors. The correction factors may be determined using matrix-ratio computation or minimum mean square error (MMSE) computation on the downlink and uplink channel response estimates, as described below.

The calibration may be performed in real time based on over-the-air transmission. Each user terminal in the system may perform calibration with one or multiple access points to derive its correction factors. Similarly, each access point may perform calibration with one or multiple user terminals to derive its correction factors. For an orthogonal frequency division multiplexing (OFDM) system, the calibration may be performed for a set of frequency subbands to obtain correction factors for each frequency subband in the set. Correction factors for other "uncalibrated" frequency subbands may be interpolated based on the correction factors obtained for the "calibrated" frequency subbands.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout.

DETAILED DESCRIPTION

The calibration techniques described herein may be used for various wireless communication systems. Moreover, these techniques may be used for single-input single-output (SISO) systems, multiple-input single-output (MISO) systems, single-input multiple-output (SIMO) systems, and multiple-input multiple-output (MIMO) systems.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial channel of the MIMO channel and corresponds to a dimension. The MIMO system can provide improved performance (e.g., increased transmission capacity) if the additional dimensionalities created by the multiple transmit and receive antennas are utilized. This typically requires an accurate estimate of the channel response between the transmitter and receiver.

Figure 1:
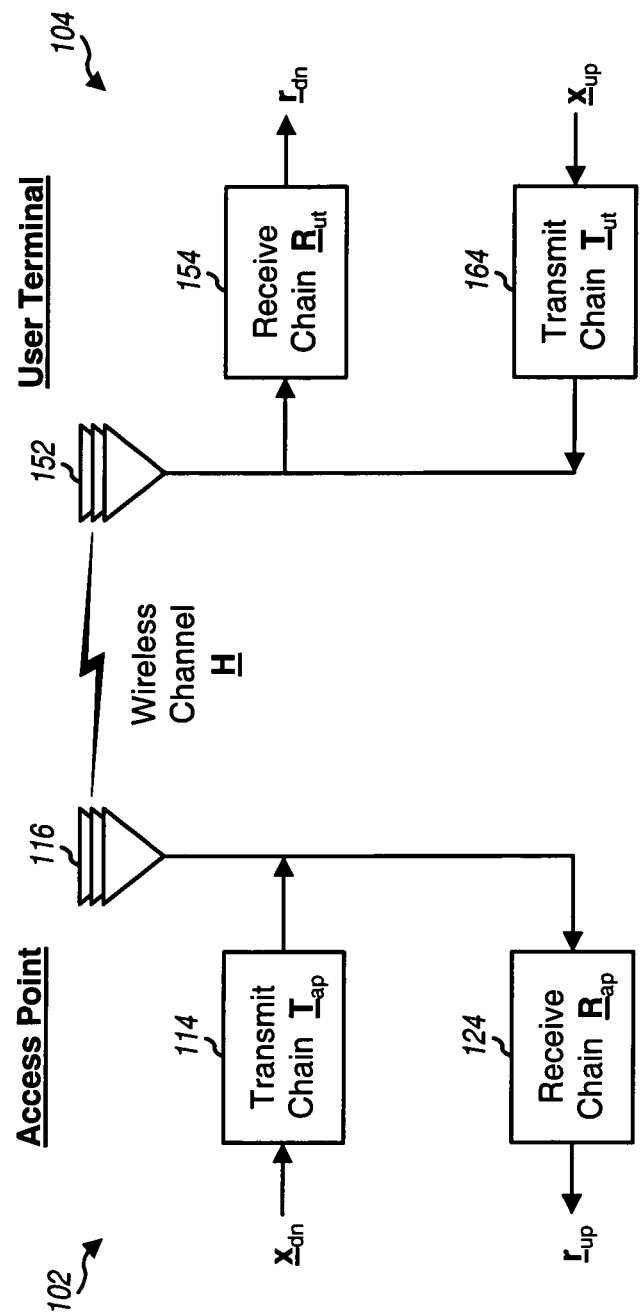
FIG. 1 shows the transmit and receive chains at an access point and a user terminal in a MIMO system.

FIG. 1 shows a block diagram of the transmit and receive chains at an access point 102 and a user terminal 104 in a MIMO system. For this system, the downlink and uplink share the same frequency band in a time division duplexed manner.

For the downlink, at access point 102, symbols (denoted by a "transmit" vector $\underline{x}_{dn}$) are processed by a transmit chain 114 and transmitted from $N_{ap}$ antennas 116 over a wireless channel. At user terminal 104, the downlink signals are received by $N_{ut}$ antennas 152 and processed by a receive chain 154 to obtain received symbols (denoted by a "receive" vector $\underline{r}_{dn}$). The processing by transmit chain 114 typically includes digital-to-analog conversion, amplification, filtering, frequency upconversion, and so on. The processing by receive chain 154 typically includes frequency downconversion, amplification, filtering, analog-to-digital conversion, and so on.

For the uplink, at user terminal 104, symbols (denoted by transmit vector $\underline{x}_{up}$) are processed by a transmit chain 164 and transmitted from $N_{ut}$ antennas 152 over the wireless channel. At access point 102, the uplink signals are received by $N_{ap}$ antennas 116 and processed by a receive chain 124 to obtain received symbols (denoted by receive vector $\underline{r}_{up}$).

For the downlink, the receive vector at the user terminal may be expressed as:

$$\underline{r}_{dn} = \underline{R}_{ut} \underline{H} \underline{T}_{ap} \underline{x}_{dn}, \quad \text{Eq (1)}$$

where
- $\underline{x}_{dn}$ is the transmit vector with $N_{ap}$ entries for the symbols transmitted from the $N_{ap}$ antennas at the access point;
- $\underline{r}_{dn}$ is the receive vector with $N_{ut}$ entries for the symbols received on the $N_{ut}$ antennas at the user terminal;
- $\underline{T}_{ap}$ is an $N_{ap} \times N_{ap}$ diagonal matrix with entries for the complex gains associated with the transmit chain for the $N_{ap}$ antennas at the access point;
- $\underline{R}_{ut}$ is an $N_{ut} \times N_{ut}$ diagonal matrix with entries for the complex gains associated with the receive chain for the $N_{ut}$ antennas at the user terminal; and
- $\underline{H}$ is an $N_{ut} \times N_{ap}$ channel response matrix for the downlink.

The responses of the transmit and receive chains and the response of the wireless channel are typically a function of frequency. For simplicity, the responses are assumed to be flat-fading (i.e., flat frequency responses).

For the uplink, the receive vector at the access point may be expressed as:

$$\underline{r}_{up} = \underline{R}_{ap} \underline{H}^T \underline{T}_{ut} \underline{x}_{up}, \quad \text{Eq (2)}$$

where
- $\underline{x}_{up}$ is the transmit vector for the symbols transmitted from the $N_{ut}$ antennas at the user terminal;
- $\underline{r}_{up}$ is the receive vector for the symbols received on the $N_{ap}$ antennas at the access point;
- $\underline{T}_{ut}$ is an $N_{ut} \times N_{ut}$ diagonal matrix with entries for the complex gains associated with the transmit chain for the $N_{ut}$ antennas at the user terminal;
- $\underline{R}_{ap}$ is an $N_{ap} \times N_{ap}$ diagonal matrix with entries for the complex gains associated with the receive chain for the $N_{ap}$ antennas at the access point; and
- $\underline{H}^T$ is an $N_{ap} \times N_{ut}$ channel response matrix for the uplink.

For a TDD system, since the downlink and uplink share the same frequency band, a high degree of correlation normally exists between the downlink and uplink channel responses. Thus, the downlink and uplink channel response matrices may be assumed to be reciprocal (or transposes) of each other and denoted as $\underline{H}$ and $\underline{H}^T$, respectively, as shown in equations (1) and (2). However, the responses of the transmit and receive chains at the access point are typically not equal to the responses of the transmit and receive chains at the user terminal. The differences then result in the following inequality $\underline{R}_{ap} \underline{H}^T \underline{T}_{ut} \neq (\underline{R}_{ut} \underline{H} \underline{T}_{ap})^T$.

From equations (1) and (2), the "effective" downlink and uplink channel responses, $\underline{H}_{dn}$ and $\underline{H}_{up}$, which include the responses of the applicable transmit and receive chains, may be expressed as:

$$\underline{H}_{dn} = \underline{R}_{ut} \underline{H} \underline{T}_{ap} \text{ and } \underline{H}_{up} = \underline{R}_{ap} \underline{H}^T \underline{T}_{ut}. \quad \text{Eq (3)}$$

Combining the two equations in equation set (3), the following relationship may be obtained:

$$\underline{R}_{ut}^{-1} \underline{H}_{dn} \underline{T}_{ap}^{-1} = (\underline{R}_{ap}^{-1} \underline{H}_{up} \underline{T}_{ut}^{-1})^T = \underline{T}_{ut}^{-1} \underline{H}_{up}^T \underline{R}_{ap}^{-1}. \quad \text{Eq (4)}$$

Rearranging equation (4), the following is obtained:

$$\underline{H}_{up}^T = \underline{T}_{ut} \underline{R}_{ut}^{-1} \underline{H}_{dn} \underline{T}_{ap}^{-1} \underline{R}_{ap} = \underline{K}_{ut}^{-1} \underline{H}_{dn} \underline{K}_{ap}$$

or $$\underline{H}_{up} = (\underline{K}_{ut}^{-1} \underline{H}_{dn} \underline{K}_{ap})^T, \quad \text{Eq (5)}$$

where $\underline{K}_{ut} = \underline{T}_{ut}^{-1}\underline{R}_{ut}$ and $\underline{K}_{ap} = \underline{T}_{ap}^{-1}\underline{R}_{ap}$. Equation (5) may also be expressed as:

$$\underline{H}_{up}\underline{K}_{ut} = (\underline{H}_{dn}\underline{K}_{ap})^T. \qquad \text{Eq (6)}$$

The left-hand side of equation (6) represents one form of the calibrated uplink channel response, and the right-hand side represents the transpose of one form of the calibrated downlink channel response. The application of the diagonal matrices, $\underline{K}_{ut}$ and $\underline{K}_{ap}$, to the effective downlink and uplink channel responses, as shown in equation (6), allows the calibrated channel responses for the downlink and uplink to be expressed as transposes of each other. The $N_{ap} \times N_{ap}$ diagonal matrix $\underline{K}_{ap}$ for the access point is the ratio of the receive chain response $\underline{R}_{ap}$ to the transmit chain response $\underline{T}_{ap}$ (or $$\left(\text{or } K_{ap} = \frac{R_{ap}}{T_{ap}}\right),$$

where the ratio is taken element-by-element. Similarly, the $N_{ut} \times N_{ut}$ diagonal matrix $\underline{K}_{ut}$ for the user terminal is the ratio of the receive chain response $\underline{R}_{ut}$ to the transmit chain response $T_{ut}$.

Figure 2A:
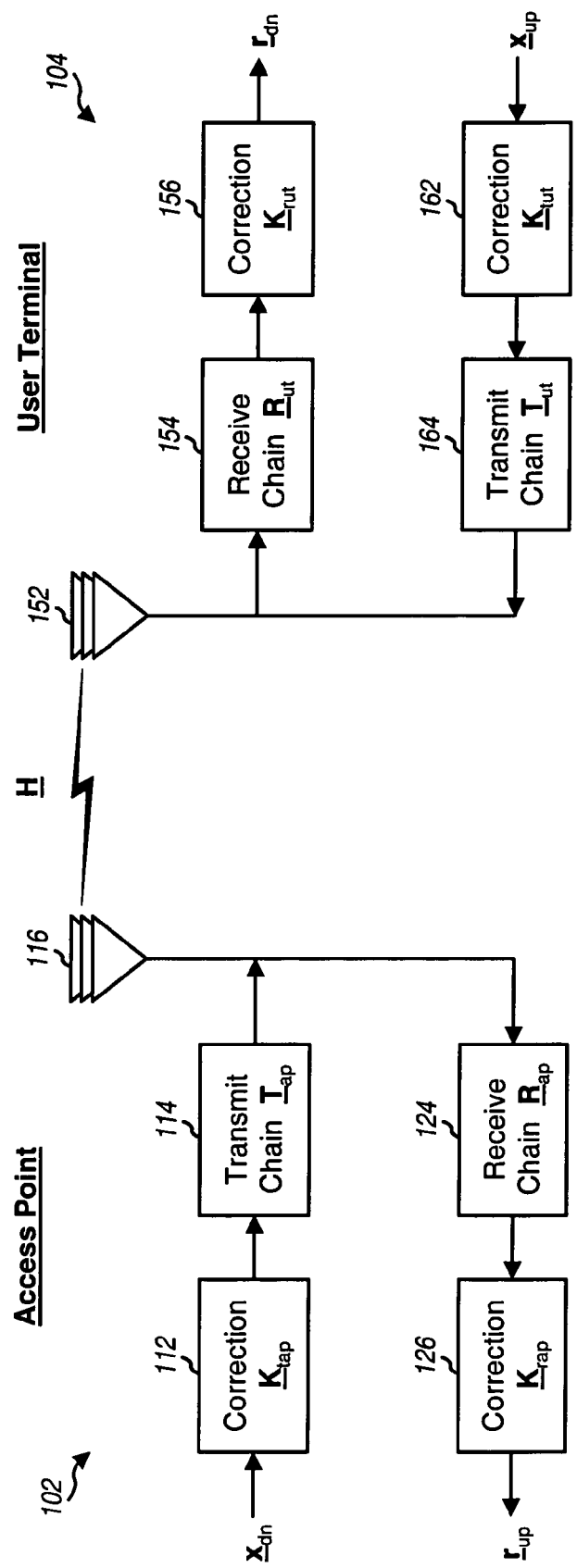
FIG. 2A illustrates the application of correction factors on both the transmit and receive sides at the access point and the user terminal.

FIG. 2A illustrates the application of correction matrices on both the transmit and receive sides at the access point and the user terminal to account for differences in the transmit and receive chains at the access point and the user terminal. On the downlink, the transmit vector $x_{dn}$ is first multiplied with a matrix $\underline{K}_{tap}$ by a unit 112. The processing by transmit chain 114 and receive chain 154 for the downlink is the same as shown in FIG. 1. The output of receive chain 154 is multiplied with a matrix $\underline{K}_{rut}$ by a unit 156, which provides the received vector $r_{dn}$ for the downlink. On the uplink, the transmit vector $x_{up}$ is first multiplied with a matrix $\underline{K}_{tut}$ by a unit 162. The processing by transmit chain 164 and receive chain 124 for the uplink is the same as shown in FIG. 1. The output of receive chain 124 is multiplied with a matrix $\underline{K}_{rap}$ by a unit 126, which provides the received vector $r_{up}$ for the uplink.

The calibrated downlink and uplink channel responses, with correction matrices applied at the access point and the user terminal as shown in FIG. 2A, may be expressed as:

$$\underline{H}_{cdn} = \underline{K}_{rut}\underline{R}_{ut}\underline{H}\underline{T}_{ap}\underline{K}_{tap} \text{ and } \underline{H}_{cup} = \underline{K}_{rap}\underline{R}_{ap}\underline{H}^T\underline{T}_{ut}\underline{K}_{tut}. \qquad \text{Eq (7)}$$

If $\underline{H}_{cdn} = \underline{H}_{cup}^T$, then the two equations in equation set (7) may be combined as follows:

$$\underline{H}_{cdn} = \underline{K}_{rut}\underline{R}_{ut}\underline{T}_{ap}\underline{K}_{tap} = (\underline{K}_{rap}\underline{R}_{ap}\underline{H}^T\underline{T}_{ut}\underline{K}_{tut})^T = \underline{H}_{cup}^T. \qquad \text{Eq (8)}$$

Rearranging the terms in equation (8), the following is obtained:

$$\underline{T}_{ut}^{-1}\underline{R}_{ut}\underline{K}_{tut}^{-1}\underline{K}_{rut}\underline{H} = \underline{H}\underline{R}_{ap}\underline{T}_{ap}^{-1}\underline{K}_{rap}\underline{K}_{tap}^{-1}. \qquad \text{Eq (9)}$$

The diagonal matrices have been reshuffled in equation (9) using the property AB=BA for diagonal matrices A and B.

Equation (9) indicates that the calibrated downlink and uplink channel responses may be obtained by satisfying the following conditions:

$$a \cdot \underline{T}_{ut}^{-1}\underline{R}_{rut} = \underline{K}_{tut}\underline{K}_{rut}^{-1} = \underline{K}_{ut}, \text{ and} \qquad \text{Eq (10a)}$$

$$a \cdot \underline{T}_{ap}^{-1}\underline{R}_{rap} = \underline{K}_{tap}\underline{K}_{rap}^{-1} = \underline{K}_{ap}, \qquad \text{Eq (10b)}$$

where a is an arbitrary complex proportionality constant.

In general, correction factors for the access point may be applied on the transmit side and/or the receive side at the access point. Similarly, correction factors for the user terminal may be applied on the transmit side and/or the receive side at the user terminal. For a given station, which may be the access point or the user terminal, the correction matrix for that station may be partitioned into a correction matrix for the transmit side and a correction matrix for the receive side. The correction matrix for one side (which may be either the transmit or receive side) may be an identity matrix I or an arbitrarily selected matrix. The correction matrix for the other side would then be uniquely specified. The correction matrices need not directly address the transmit and/or receive chain errors, which typically cannot be measured.

Table 1 lists nine possible configurations for applying the correction factors at the access point and the user terminal. For configuration 1, correction factors are applied on both the transmit and receive sides at the access point, and also on both the transmit and recieve sides at the user terminal. For configuration 2, correction factors are applied on only the transmit side at both the access point and the user terminal, where $\underline{K}_{tap} = \underline{K}_{ap}$, $\underline{K}_{rap} = I$, $\underline{K}_{tut} = \underline{K}_{ut}$, and $\underline{K}_{rut} = I$. For configuration 3, correction factors are applied on only the receive side at both the access point and the user terminal, where $\underline{K}_{rap} = \underline{K}_{ap}^{-1}$, $\underline{K}_{tap} = I$, $\underline{K}_{rut} = \underline{K}_{ut}^{-1}$, and $\underline{K}_{tut} = I$. The other configurations are shown in Table 1.

TABLE 1

| | Access point | | User terminal | |
|---|---|---|---|---|
| Configuration | Transmit | Receive | Transmit | Receive |
| 1 | $K_{tap}$ | $K_{rap}$ | $K_{tut}$ | $K_{rut}$ |
| 2 | $K_{ap}$ | I | $K_{ut}$ | I |
| 3 | I | $K_{ap}^{-1}$ | I | $K_{ut}^{-1}$ |
| 4 | $K_{ap}$ | I | I | $K_{ut}^{-1}$ |
| 5 | I | $K_{ap}^{-1}$ | $K_{ut}$ | I |
| 6 | $K_{tap}$ | $K_{rap}$ | $K_{ut}$ | I |
| 7 | $K_{tap}$ | $K_{rap}$ | I | $K_{ut}^{-1}$ |
| 8 | $K_{ap}$ | I | $K_{tut}$ | $K_{rut}$ |
| 9 | I | $K_{ap}^{-1}$ | $K_{tut}$ | $K_{rut}$ |

Figure 2B:
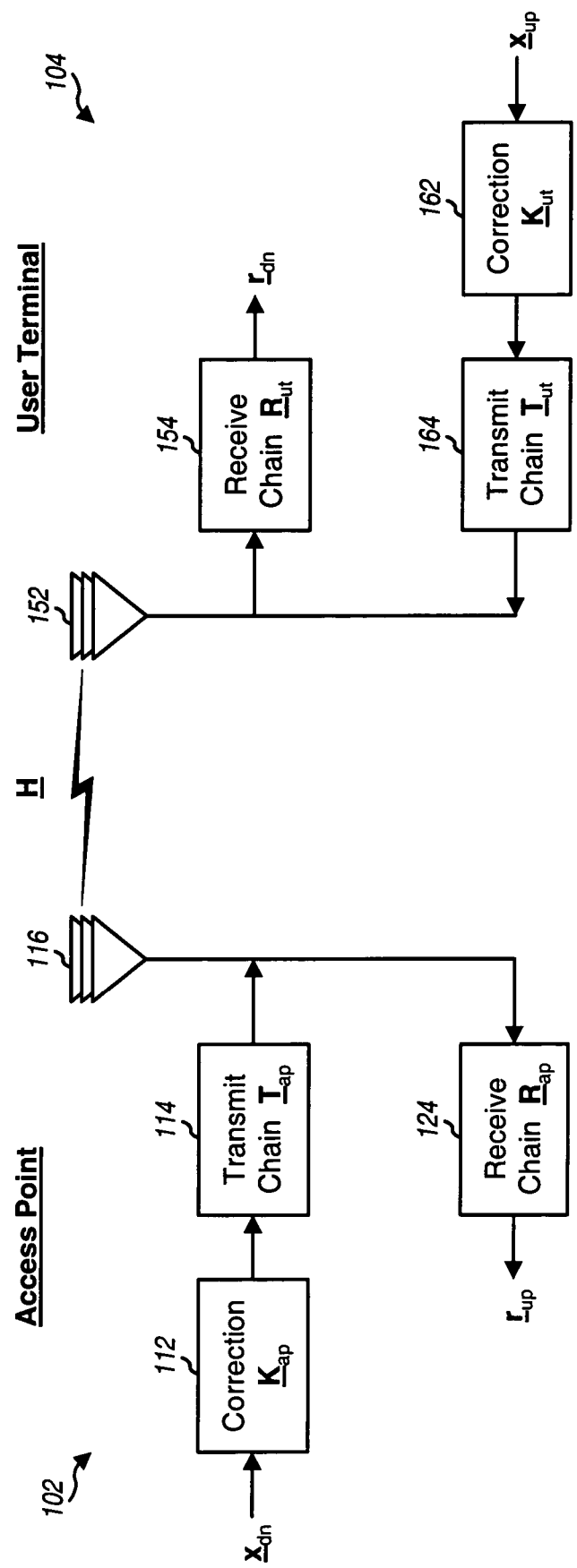
FIG. 2B illustrates the application of correction factors on the transmit side at both the access point and the user terminal.

FIG. 2B illustrates the application of correction matrices $\underline{K}_{ap}$ and $\underline{K}_{ut}$ on the transmit sides for configuration 2 to account for differences in the transmit and receive chains at the access point and the user terminal. On the downlink, the transmit vector $x_{dn}$ is first multiplied with the correction matrix $\underline{K}_{ap}$ by unit 112. The subsequent processing by transmit chain 114 and receive chain 154 for the downlink is the same as shown in FIG. 1. On the uplink, the transmit vector $x_{up}$ is first multiplied with the correction matrix $\underline{K}_{ut}$ by unit 162. The subsequent processing by transmit chain 164 and receive chain 124 for the uplink is the same as shown in FIG. 1. The calibrated downlink and uplink channel responses observed by the user terminal and access point, respectively, may then be expressed as:

$$\underline{H}_{cdn} = \underline{H}_{dn}\underline{K}_{ap} \text{ and } \underline{H}_{cup} = \underline{H}_{up}\underline{K}_{ut}. \qquad \text{Eq (11)}$$

Figure 2C:
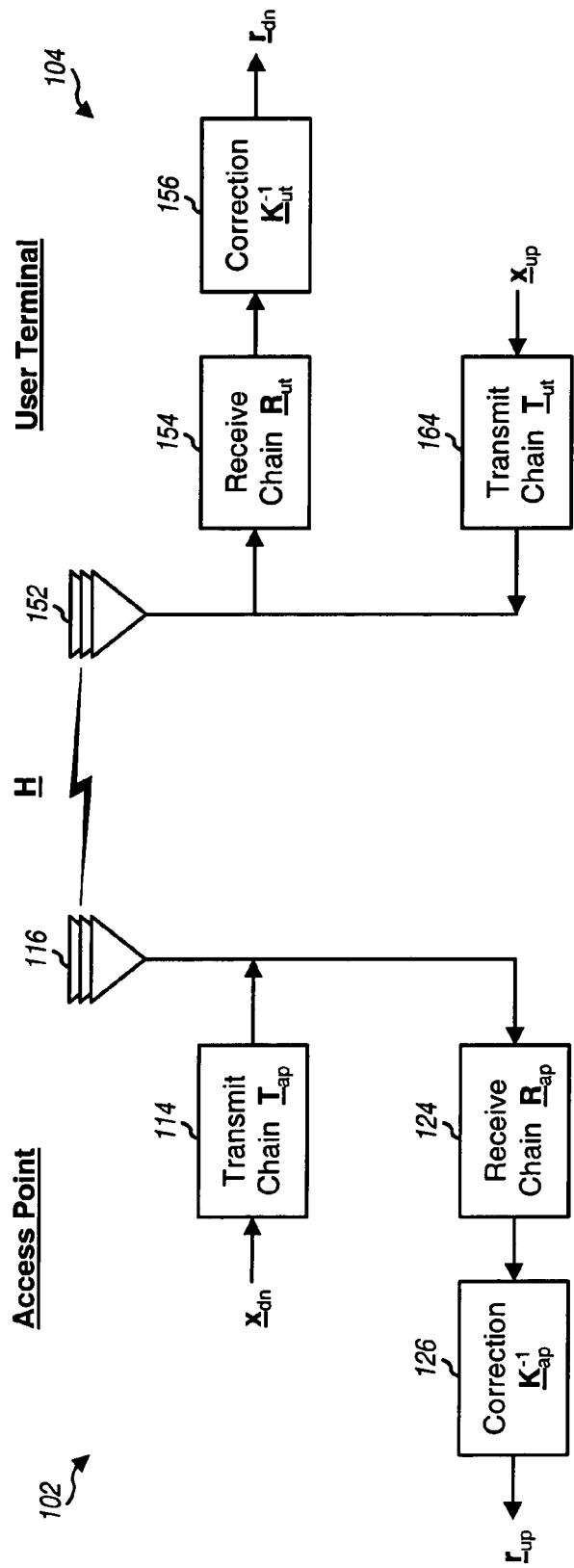
FIG. 2C illustrates the application of correction factors on the receive side at both the access point and the user terminal.

FIG. 2C illustrates the application of correction matrices $\underline{K}_{ap}^{-1}$ and $\underline{K}_{ut}^{-1}$ on the receive sides for configuration 3 to account for differences in the transmit and receive chains at the access point and the user terminal. On the downlink, the transmit vector $x_{dn}$ is processed by transmit chain 114 at the access point. The downlink signals are processed by receive chain 154 and further multiplied with the correction matrix $\underline{K}_{ut}^{-1}$ by unit 156 at the user terminal to obtain the received vector $r_{dn}$. On the uplink, the transmit vector $x_{up}$ is processed by transmit chain 164 at the user terminal. The uplink signals are processed by receive chain 124 and further multiplied with the correction matrix $\underline{K}_{ap}^{-1}$ by unit 126 at the access point to obtain the received vector $r_{up}$. The calibrated downlink and uplink channel responses observed by the user terminal and the access point, respectively, may then be expressed as:

$$\underline{H}_{cdn} = \underline{K}_{ut}^{-1} \underline{H}_{dn} \text{ and } \underline{H}_{cup} = \underline{K}_{ap}^{-1} \underline{H}_{up}. \quad \text{Eq (12)}$$

As shown in Table 1, the correction matrices include values that can account for differences in the transmit and receive chains at the access point and user terminal. This would then allow the channel response for one link to be expressed by the channel response for the other link. The calibrated downlink and uplink channel responses can have various forms, depending on whether the correction factors are applied at the access point and the user terminal. For example, the calibrated downlink and uplink channel responses may be expressed as shown in equations (7), (11) and (12).

Calibration may be performed to determine the matrices $\underline{K}_{ap}$ and $\underline{K}_{ut}$. Typically, the true channel response $\underline{H}$ and the transmit and receive chain responses are not known nor can they be exactly or easily ascertained. Instead, the effective downlink and uplink channel responses, $\underline{H}_{dn}$ and $\underline{H}_{up}$, may be estimated based on pilots sent on the downlink and uplink, respectively, as described below. Correction matrices $\hat{\underline{K}}_{ap}$ and $\hat{\underline{K}}_{ut}$, which are estimates of the "true" matrices $\underline{K}_{ap}$ and $\underline{K}_{ut}$, may then be derived based on the downlink and uplink channel response estimates, $\hat{\underline{H}}_{dn}$ and $\hat{\underline{H}}_{up}$, as described below. The matrices $\hat{\underline{K}}_{ap}$ and $\hat{\underline{K}}_{ut}$ include correction factors that can account for differences in the transmit and receive chains at the access point and user terminal. Once the transmit and receive chains have been calibrated, a calibrated channel response estimate obtained for one link (e.g., $\hat{\underline{H}}_{cdn}$) may be used to determine an estimate of the calibrated channel response for the other link (e.g., $\hat{\underline{H}}_{cup}$).

The calibration techniques described herein may also be used for wireless communication systems that employ OFDM. OFDM effectively partitions the overall system bandwidth into a number of ($N_F$) orthogonal subbands, which are also referred to as tones, subcarriers, frequency bins, or subchannels. With OFDM, each subband is associated with a respective subcarrier that may be modulated with data. For a MIMO system that utilizes OFDM (i.e., a MIMO-OFDM system), each subband of each spatial channel may be viewed as an independent transmission channel.

The calibration may be performed in various manners. For clarity, a specific calibration scheme is described below for a TDD MIMO-OFDM system.

Figure 3:
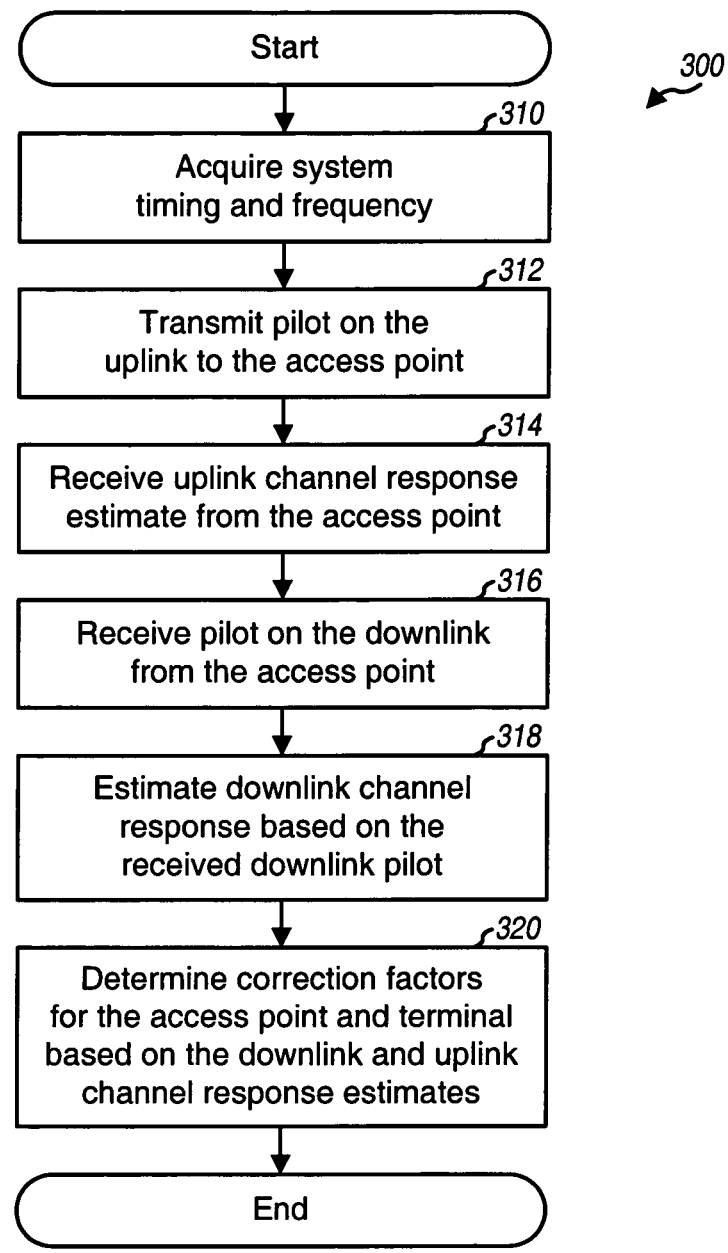
FIG. 3 shows a process for calibrating the downlink and uplink channel responses in a TDD MIMO-OFDM system.

FIG. 3 shows a flow diagram of an embodiment of a process 300 for calibrating the downlink and uplink channel responses in the TDD MIMO-OFDM system. Initially, the user terminal acquires the timing and frequency of the access point using acquisition procedures defined for the system (block 310). The user terminal may then send a message to initiate calibration with the access point, or the calibration may be initiated by the access point. The calibration may be performed in parallel with registration/authentication of the user terminal by the access point (e.g., during call setup) and may also be performed whenever warranted.

The calibration may be performed for all subbands that may be used for data transmission (which are referred to as the "data" subbands). Subbands not used for data transmission (e.g., guard subbands) typically do not need to be calibrated. However, since the frequency responses of the transmit and receive chains at the access point and the user terminal are typically flat over most of the subbands of interest, and since adjacent subbands are likely to be correlated, the calibration may be performed for only a subset of the data subbands. If fewer than all data subbands are calibrated, then the subbands to be calibrated (which are referred to as the "designated" subbands) may be signaled to the access point (e.g., in the message sent to initiate the calibration).

For the calibration, the user terminal transmits a MIMO pilot on the designated subbands to the access point (block 312). The generation of the MIMO pilot is described in detail below. The duration of the uplink MIMO pilot transmission may be dependent on the number of designated subbands. For example, 8 OFDM symbols may be sufficient if calibration is performed for four subbands, and more (e.g., 20) OFDM symbols may be needed for more subbands. The total transmit power is typically fixed. If the MIMO pilot is transmitted on a small number of subbands, then higher amounts of transmit power may be used for each of these subbands, and the SNR for each subband is higher. Conversely, if the MIMO pilot is transmitted on a large number of subbands, then smaller amounts of transmit power may be used for each subband, and the SNR for each subband is worse. If the SNR of each subband is not sufficiently high, then more OFDM symbols may be sent for the MIMO pilot and integrated at the receiver to obtain a higher overall SNR for the subband.

The access point receives the uplink MIMO pilot and derives an estimate of the uplink channel response, $\hat{\underline{H}}_{up}(k)$, for each of the designated subbands, where k represents the subband index. Channel estimation based on the MIMO pilot is described below. The uplink channel response estimates are quantized and sent to the user terminal (block 314). The entries in each matrix $\hat{\underline{H}}_{up}(k)$ are complex channel gains between the $N_{ut}$ transmit and $N_{ap}$ receive antennas for the uplink for subband k. The channel gains for all matrices may be scaled by a particular scaling factor, which is common across all designated subbands, to obtain the desired dynamic range. For example, the channel gains in each matrix $\hat{\underline{H}}_{up}(k)$ may be inversely scaled by the largest channel gain for all matrices $\hat{\underline{H}}_{up}(k)$ for the designated subbands, so that the largest channel gain has a magnitude of one. Since the goal of the calibration is to normalize the gain/phase difference between the downlink and uplink channels, the absolute channel gains are not important. If 12-bit complex values (i.e., with 12-bit inphase (I) and 12-bit quadrature (Q) components) are used for the channel gains, then the downlink channel response estimates may be sent to the user terminal in $3 \cdot N_{ut} \cdot N_{ap} \cdot N_{sb}$ bytes, where "3" is for the 24 total bits used to represent the I and Q components and $N_{sb}$ is the number of designated subbands.

The user terminal also receives a downlink MIMO pilot transmitted by the access point (block 316) and derives an estimate of the downlink channel response, $\hat{\underline{H}}_{dn}(k)$, for each of the designated subbands based on the received pilot (block 318). The user terminal then determines correction factors, $\hat{\underline{K}}_{ap}(k)$ and $\hat{\underline{K}}_{ut}(k)$, for each of the designated subbands based on the uplink and downlink channel response estimates, $\hat{\underline{H}}_{up}(k)$ and $\hat{\underline{H}}_{dn}(k)$ (block 320).

For the derivation of the correction factors, the downlink and uplink channel responses for each subband are assumed to be reciprocal, with gain/phase corrections to account for the differences in the transmit and receive chains at the access point and user terminal, as follows:

$$\underline{H}_{up}(k)\underline{K}_{ut}(k) = (\underline{H}_{dn}(k)\underline{K}_{ap}(k))^T, \text{ for } k \in K, \quad \text{Eq (13)}$$

where K represents a set of all data subbands. Since only estimates of the effective downlink and uplink channel responses are available for the designated subbands during calibration, equation (13) may be rewritten as:

$$\hat{\underline{H}}_{up}(k)\hat{\underline{K}}_{ut}(k) = (\hat{\underline{H}}_{dn}(k)\hat{\underline{K}}_{ap}(k))^T, \text{ for } k \in K', \quad \text{Eq (14)}$$

where K' represents a set of all designated subbands. A correction vector $\hat{\underline{k}}_{ut}(k)$ may be defined to include the $N_{ut}$ diagonal elements of $\hat{K}_{ut}(k)$. Thus, $\hat{\underline{k}}_{ut}(k)$ and $\hat{K}_{ut}(k)$ are equivalent. Similarly, a correction vector $\hat{\underline{k}}_{ap}(k)$ may be defined to include the $N_{ap}$ diagonal elements of $\hat{K}_{ap}(k)$. $\hat{\underline{k}}_{ap}(k)$ and $\hat{K}_{ap}(k)$ are also equivalent.

The correction factors $\hat{K}_{ap}(k)$ and $\hat{K}_{ut}(k)$ may be derived from the channel estimates $\hat{H}_{dn}(k)$ and $\hat{H}_{up}(k)$ in various manners, including by matrix-ratio computation and MMSE computation. Both of these computation methods are described in further detail below. Other computation methods may also be used, and this is within the scope of the invention.

A. Matrix-Ratio Computation

Figure 4:
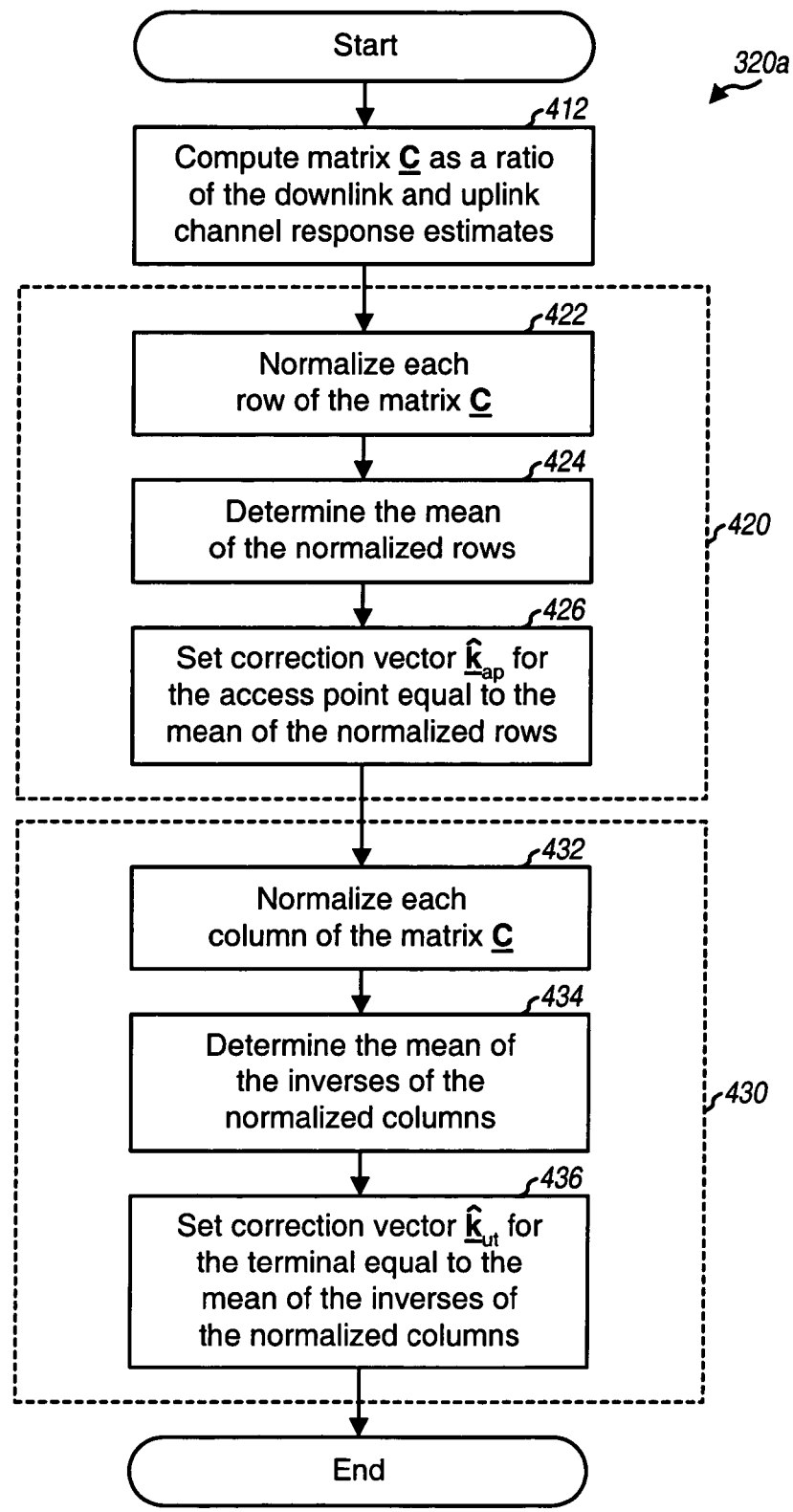
FIG. 4 shows a process for deriving estimates of the correction vectors from the downlink and uplink channel response estimates.

FIG. 4 shows a flow diagram of an embodiment of a process 320a for deriving the correction vectors $\hat{\underline{k}}_{ut}(k)$ and $\hat{\underline{k}}_{ap}(k)$ from the uplink and downlink channel response estimates $\hat{H}_{up}(k)$ and $\hat{H}_{dn}(k)$ using matrix-ratio computation. Process 320a may be used for block 320 in FIG. 3.

Initially, an $N_{ut} \times N_{ap}$ matrix $\underline{C}(k)$ is computed for each designated subband (block 412), as follows:

$$\underline{C}(k) = \frac{\hat{\underline{H}}_{up}^{T}(k)}{\hat{\underline{H}}_{dn}(k)}, \text{ for } k \in K', \qquad \text{Eq (15)}$$

where the ratio is taken element-by-element. Each element of $\underline{C}(k)$ may thus be computed as:

$$c_{i,j}(k) = \frac{\hat{h}_{up\,i,j}(k)}{\hat{h}_{dn\,i,j}(k)}, \text{ for } i = 1, \ldots, N_{ut} \text{ and } j = 1, \ldots, N_{ap}, \qquad \text{Eq (16)}$$

where $\hat{h}_{up\,i,j}(k)$ and $\hat{h}_{dn\,i,j}(k)$ are the (i,j)-th (row, column) element of $\hat{\underline{H}}_{up}^{T}(k)$ and $\hat{\underline{H}}_{dn}(k)$, respectively, and $c_{i,j}(k)$ is the (i, j)-th element of $\underline{C}(k)$.

In an embodiment, the correction vector for the access point, $\hat{\underline{k}}_{ap}(k)$, is defined to be equal to the mean of the normalized rows of $\underline{C}(k)$ and is derived by block 420. Each row of $\underline{C}(k)$ is first normalized by scaling each of the $N_{ap}$ elements in the row with the first element in the row (block 422). Thus, if $\underline{c}_i(k) = [c_{i,1}(k) \ldots c_{i,N_{ap}}(k)]$ is the i-th row of $\underline{C}(k)$, then the normalized row $\underline{\tilde{c}}_i(k)$ may be expressed as:

$$\underline{\tilde{c}}_i(k) = [c_{i,1}(k)/c_{i,1}(k) \ldots c_{i,j}(k)/c_{i,1}(k) \ldots c_{i,N_{ap}}(k)/c_{i,1}(k)]. \qquad \text{Eq (17)}$$

The mean of the normalized rows is then determined as the sum of the $N_{ut}$ normalized rows divided by $N_{ut}$ (block 424). The correction vector $\hat{\underline{k}}_{ap}(k)$ is set equal to this mean (block 426), which may be expressed as:

$$\hat{\underline{k}}_{ap}(k) = \frac{1}{N_{ut}} \sum_{i=1}^{N_{ut}} \underline{\tilde{c}}_i(k), \text{ for } k \in K'. \qquad \text{Eq (18)}$$

Because of the normalization, the first element of $\hat{\underline{k}}_{ap}(k)$ is unity.

In an embodiment, the correction vector for the user terminal, $\hat{\underline{k}}_{ut}(k)$, is defined to be equal to the mean of the inverses of the normalized columns of $\underline{C}(k)$ and is derived by block 430. The j-th column of $\underline{C}(k)$ is first normalized by scaling each element in the column with the j-th element of the vector $\hat{\underline{k}}_{ap}(k)$, which is denoted as $K_{ap,j,j}(k)$ (block 432). Thus, if $\underline{c}_j(k) = [c_{1,j}(k) \ldots c_{N_{ut},j}(k)]^T$ is the j-th column of $\underline{C}(k)$, then the normalized column $\underline{\check{c}}_j(k)$ may be expressed as:

$$\underline{\check{c}}_j(k) = [c_{1,j}(k)/K_{ap,j,j}(k) \ldots c_{i,j}(k)/K_{ap,j,j}(k) \ldots c_{N_{ut},j}(k)/K_{ap,j,j}(k)]^T. \qquad \text{Eq (19)}$$

The mean of the inverses of the normalized columns is then determined as the sum of the inverses of the $N_{ap}$ normalized columns divided by $N_{ap}$ (block 434). The correction vector $\hat{\underline{k}}_{ut}(k)$ is set equal to this mean (block 436), which may be expressed as:

$$\hat{k}_{ut}(k) = \frac{1}{N_{ap}} \sum_{j=1}^{N_{ap}} \frac{1}{\underline{\check{c}}_j(k)}, \text{ for } k \in K', \qquad \text{Eq (20)}$$

where the inversion of the normalized columns, $\underline{\check{c}}_j(k)$, is performed element-wise.

B. MMSE Computation

For the MMSE computation, the correction factors $\hat{K}_{ap}(k)$ and $\hat{K}_{ut}(k)$ are derived from the downlink and uplink channel response estimates $\hat{H}_{dn}(k)$ and $\hat{H}_{up}(k)$ such that the mean square error (MSE) between the calibrated downlink channel response and the calibrated uplink channel response is minimized. This condition may be expressed as:

$$\min |(\hat{H}_{dn}(k)\hat{K}_{ap}(k))^T - \hat{H}_{up}(k)\hat{K}_{ut}(k)|^2, \text{ for } k \in K, \qquad \text{Eq (21)}$$

which may also be written as:

$$\min |\hat{K}_{ap}(k)\hat{H}_{dn}^{T}(k) - \hat{H}_{up}(k)\hat{K}_{ut}(k)|^2, \text{ for } k \in K,$$

where $\hat{K}_{ap}(k) = \hat{K}_{ap}(k)$ since $\hat{K}_{ap}(k)$ is a diagonal matrix.

Equation (21) is subject to the constraint that the lead element of $\hat{K}_{ap}(k)$ is set equal to unity, or $K_{ap,0,0}(k)=1$. Without this constraint, the trivial solution would be obtained with all elements of the matrices $\hat{K}_{ap}(k)$ and $\hat{K}_{ut}(k)$ set equal to zero. In equation (21), a matrix $\underline{Y}(k)$ is first obtained as $\underline{Y}(k) = \hat{K}_{ap}(k)\hat{H}_{dn}^{T}(k) - \hat{H}_{up}(k)\hat{K}_{ut}(k)$. The square of the absolute value is next obtained for each of the $N_{ap} \cdot N_{ut}$ entries of the matrix $\underline{Y}(k)$. The mean square error (or the square error, since a divide by $N_{ap} \cdot N_{ut}$ is omitted) is then equal to the sum of all $N_{ap} \cdot N_{ut}$ squared values.

The MMSE computation is performed for each designated subband to obtain the correction factors $\hat{K}_{ap}(k)$ and $\hat{K}_{ut}(k)$ for that subband. The MMSE computation for one subband is described below. For simplicity, the subband index k is omitted in the following description. Also for simplicity, the elements of the downlink channel response estimate $\hat{H}_{dn}^{T}$ are denoted as $\{a_{ij}\}$, the elements of the uplink channel response estimate $\hat{H}_{up}$ are denoted as $\{b_{ij}\}$, the diagonal elements of the matrix $\hat{K}_{ap}$ are denoted as $\{u_i\}$, and the diagonal elements of the matrix $\hat{K}_{ut}$ are denoted as $\{v_j\}$, where $i=1, \ldots, N_{ap}$ and $j=1, \ldots, N_{ut}$.

The mean square error may be rewritten from equation (21), as follows:

$$MSE = \sum_{j=1}^{N_{ut}} \sum_{i=1}^{N_{ap}} |a_{ij} u_i - b_{ij} v_j|^2, \qquad \text{Eq (22)}$$

again subject to the constraint $u_1=1$. The minimum mean square error may be obtained by taking the partial derivatives of equation (22) with respect to u and v and setting the partial derivatives to zero. The results of these operations are the following equation sets:

$$\sum_{j=1}^{N_{ut}} (a_{ij}u_i - b_{ij}v_j) \cdot a_{ij}^* = 0, \text{ for } i = 2, \ldots, N_{ap}, \text{ and} \quad \text{Eq (23a)}$$

$$\sum_{i=1}^{N_{ap}} (a_{ij}u_i - b_{ij}v_j) \cdot b_{ij}^* = 0, \text{ for } j = 1, \ldots, N_{ut}. \quad \text{Eq (23b)}$$

In equation (23a), $u_1=1$ so there is no partial derivative for this case, and the index i runs from 2 through $N_{ap}$.

The set of ($N_{ap}+N_{ut}-1$) equations in equation sets (23a) and (23b) may be more conveniently expressed in matrix form, as follows:

$$\underline{A}\underline{y}=\underline{z}, \quad \text{Eq (24)}$$

where $$\underline{A} = \begin{bmatrix} \sum_{j=1}^{N_{ut}}|a_{2j}|^2 & 0 & \cdots & 0 & -b_{21}a_{21}^* & \cdots & -b_{2N_{ap}}a_{2N_{ut}}^* \\ 0 & \sum_{j=1}^{N_{ut}}|a_{3j}|^2 & 0 & \cdots & \cdots & \cdots & \cdots \\ \cdots & 0 & \cdots & 0 & & & \\ 0 & \cdots & 0 & \sum_{j=1}^{N_{ut}}|a_{N_{ap}j}|^2 & -b_{N_{ap}1}a_{N_{ap}1}^* & & -b_{N_{ap}N_{ut}}a_{N_{ap}N_{ut}}^* \\ -a_{21}b_{21}^* & \cdots & -a_{N_{ap}1}b_{N_{ap}1}^* & \sum_{i=1}^{N_{ap}}|b_{i1}|^2 & 0 & \cdots & 0 \\ \cdots & \cdots & & 0 & \sum_{i=1}^{N_{ap}}|b_{i2}|^2 & 0 & \cdots \\ & & & & \cdots & 0 & \cdots & 0 \\ -a_{2N_{ut}}b_{2N_{ut}}^* & \cdots & -a_{N_{ap}N_{ut}}b_{N_{ap}N_{ut}}^* & 0 & \cdots & 0 & \sum_{i=1}^{N_{ap}}|b_{iN_{ut}}|^2 \end{bmatrix}$$

$$\underline{y} = \begin{bmatrix} u_2 \\ u_3 \\ \cdots \\ u_{N_{ap}} \\ v_1 \\ v_2 \\ \cdots \\ v_{N_{ut}} \end{bmatrix} \text{ and } \underline{z} = \begin{bmatrix} 0 \\ 0 \\ \cdots \\ 0 \\ a_{11}b_{11}^* \\ a_{12}b_{12}^* \\ \cdots \\ a_{1N_{ut}}b_{1N_{ut}}^* \end{bmatrix}.$$

The matrix $\underline{A}$ includes ($N_{ap}+N_{ut}-1$) rows, with the first $N_{ap}-1$ rows corresponding to the $N_{ap}-1$ equations from equation set (23a) and the last $N_{ut}$ rows corresponding to the $N_{ut}$ equations from equation set (23b). In particular, the first row of the matrix $\underline{A}$ is generated from equation set (23a) with i=2, the second row is generated with i=3, and so on. The $N_{ap}$-th row of the matrix $\underline{A}$ is generated from equation set (23b) with j=1, and so on, and the last row is generated with $j=N_{ut}$. As shown above, the entries of the matrix $\underline{A}$ and the entries of the vector $\underline{z}$ may be obtained based on the entries in the matrices $\underline{\hat{H}}_{dn}^T$ and $\underline{\hat{H}}_{up}$.

The correction factors are included in the vector $\underline{y}$, which may be obtained as:

$$\underline{y}=\underline{A}^{-1}\underline{z}. \quad \text{Eq (25)}$$

The results of the MMSE computation are correction matrices $\hat{\underline{K}}_{ap}$ and $\hat{\underline{K}}_{ut}$ that minimize the mean square error in the calibrated downlink and uplink channel responses, as shown in equation (21). Since the matrices $\hat{\underline{K}}_{ap}$ and $\hat{\underline{K}}_{ut}$ are obtained based on the downlink and uplink channel response estimates, $\underline{\hat{H}}_{dn}$ and $\underline{\hat{H}}_{up}$, the quality of the correction matrices $\hat{\underline{K}}_{ap}$ and $\hat{\underline{K}}_{ut}$ are thus dependent on the quality of the channel estimates $\underline{\hat{H}}_{dn}$ and $\underline{\hat{H}}_{up}$. The MIMO pilot may be averaged at the receiver to obtain more accurate estimates for $\underline{\hat{H}}_{dn}$ and $\underline{\hat{H}}_{up}$.

The correction matrices, $\hat{\underline{K}}_{ap}$ and $\hat{\underline{K}}_{ut}$, obtained based on the MMSE computation are generally better than the correction matrices obtained based on the matrix-ratio computation, especially when some of the channel gains are small and measurement noise can greatly degrade the channel gains.

C. Post Computation

Regardless of the particular computation method selected for use, after completion of the computation of the correction matrices, the user terminal sends to the access point the correction vectors for the access point, $\hat{\underline{k}}_{ap}(k)$, for all designated subbands. If 12-bit complex values are used for each correction factor in $\hat{\underline{k}}_{ap}(k)$, then the correction vectors $\hat{\underline{k}}_{ap}(k)$ for all designated subbands may be sent to the access point in $3 \cdot (N_{ap}-1) \cdot N_{sb}$ bytes, where "3" is for the 24 total bits used for the I and Q components, ($N_{ap}-1$) results from the first element in each vector $\hat{\underline{k}}_{ap}(k)$ being equal to unity and thus not needing to be sent, and $N_{sb}$ is the number of designated subbands. If the first element is set to $2^9-1=+511$, then 12 dB of headroom is available (since the maximum positive 12-bit signed value is $2^{11}-1=+2047$), which would then allow gain mismatch of up to 12 dB between the downlink and uplink to be accommodated by 12-bit values. If the downlink and uplink match to within 12 dB and the first element is normalized to a value of 511, then the other elements should be no greater than 511·4=2044 in absolute value and can be represented with 12 bits.

A pair of correction vectors $\hat{k}_{ap}(k)$ and $\hat{k}_{ut}(k)$ is obtained for each designated subband. The calibration may be performed for fewer than all data subbands. For example, the calibration may be performed for every n-th subband, where n may be determined by the expected response of the transmit and receive chains (e.g., n may be 2, 4, 8, 16, and so on). The calibration may also be performed for non-uniformly distributed subbands. For example, since there may be more filter roll-off at the edges of the passband, which may create more mismatch in the transmit and receive chains, more subbands near the band edges may be calibrated. In general, any number of subbands and any distribution of subbands may be calibrated, and this is within the scope of the invention.

If the calibration is performed for fewer than all of the data subbands, then the correction factors for the "uncalibrated" subbands may be obtained by interpolating the correction factors obtained for the designated subbands. The access point may perform interpolation on $\hat{k}_{ap}(k)$, for k∈K', to obtain the correction vectors $\hat{k}_{ap}(k)$, for k∈K. Similarly, the user terminal may perform interpolation on $\hat{k}_{ut}(k)$, for k∈K', to obtain the correction vectors $\hat{k}_{ut}(k)$, for k∈K.

The access point and user terminal thereafter use their respective correction vectors $\hat{k}_{ap}(k)$ and $\hat{k}_{ut}(k)$, or the corresponding correction matrices $\hat{K}_{ap}(k)$ and $\hat{K}_{ut}(k)$, for k∈K. The access point may derive the correction matrix $\hat{K}_{tap}(k)$ for its transmit side and the correction matrix $\hat{K}_{rap}(k)$ for its receive side based on its correction matrix $\hat{K}_{ap}(k)$ and with the constraint shown in equation (10a). Similarly, the user terminal may derive the correction matrix $\hat{K}_{tut}(k)$ for its transmit side and the correction matrix $\hat{K}_{rut}(k)$ for its receive side based on its correction matrix $\hat{K}_{ut}(k)$ and with the constraint shown in equation (10b).

The correction matrix $\hat{K}_{ap}(k)$ and the correction matrix $\hat{K}_{ut}(k)$ may each be split into two matrices to improve dynamic range, reduce quantization error, account for limitations of the transmit and receive chains, and so on. If there is a known imbalance on the transmit side, then transmit-side correction matrix can attempt to remove this imbalance. For example, if one antenna has a smaller power amplifier, then the transmit power of the antenna with a stronger power amplifier may be reduced by applying an appropriate correction matrix on the transmit side. However, operating the transmit side at a lower power level results in loss of performance. An adjustment may then be made on the receive side to compensate for the known transmit imbalance. If both the transmit and receive chains have smaller gains for a given antenna, for example, due to a smaller antenna gain, then calibration makes no adjustment for this antenna since the receive and transmit sides are matched.

The calibration scheme described above, whereby a vector of correction factors is obtained for each of the access point and user terminal, allows "compatible" correction vectors to be derived for the access point when the calibration is performed by different user terminals. If the access point has already been calibrated (e.g., by one or more other user terminals), then the current correction vectors may be updated with the newly derived correction vectors.

For example, if two user terminals simultaneously perform the calibration procedure, then the calibration results from these user terminals may be averaged to improve performance. However, calibration is typically performed for one user terminal at a time. The second user terminal would then observe the downlink with the correction vector for the first user terminal already applied. In this case, the product of the second correction vector with the old correction vector may be used as the new correction vector, or a "weighted averaging" (described below) may also be used. The access point typically uses a single correction vector for all user terminals, and not different ones for different user terminals (although this may also be implemented). Updates from multiple user terminals or sequential updates from one user terminal may be treated in the same manner. The updated vectors may be directly applied (by a product operation). Alternatively, if some averaging is desired to reduce measurement noise, then weighted averaging may be used as described below.

If the access point uses correction vectors $\hat{k}_{ap1}(k)$ to transmit the MIMO pilot from which the user terminal determines new correction vectors $\hat{k}_{ap2}(k)$, then the updated correction vectors $\hat{k}_3(k)$ are derived by a product of the current and new correction vectors. The correction vectors $\hat{k}_{ap1}(k)$ and $\hat{k}_{ap2}(k)$ may be derived by the same or different user terminals. In one embodiment, the updated correction vectors are defined as $\hat{k}_{ap3}(k)=\hat{k}_{ap1}(k)\cdot\hat{k}_{ap2}(k)$, where the multiplication is element-by-element. In another embodiment, the updated correction vectors are defined as $\hat{k}_3(k)=\hat{k}_{ap1}(k)\cdot\hat{k}ap2^{\alpha}(k)$, where α is a factor used to provide weighted averaging (e.g., 0<α<1). If the calibration updates are infrequent, then a value close to one for α might perform best. If the calibration updates are frequent but noisy, then a smaller value for α is better. The updated correction vectors $\hat{k}_{ap3}(k)$ may then be used by the access point until they are updated again.

As shown in equations (10a) and (10b), the correction factors for a given station (which may be an access point or a user terminal) account for the responses of the transmit and receive chains at that station. An access point may perform calibration with a first user terminal to derive its correction factors and thereafter use these correction factors for communication with a second user terminal, without having to perform calibration with the second user terminal. Similarly, a user terminal may perform calibration with a first access point to derive its correction factors and thereafter use these correction factors for communication with a second access point, without having to perform calibration with the second access point. This can reduce overhead for calibration for an access point that communicates with multiple user terminals and for a user terminal that communicates with multiple access points, since calibration is not needed for each communicating pair of stations.

In the above description, the correction vectors $\hat{k}_{ap}(k)$ and $\hat{k}_{ut}(k)$, for k∈K', are derived by the user terminal, and the vectors $\hat{k}_{ap}(k)$ are sent back to the access point. This scheme advantageously distributes the calibration processing among the user terminals for a multiple-access system. However, the correction vectors $\hat{k}_{ap}(k)$ and $\hat{k}_{ut}(k)$ may also be derived by the access point, which would then send the vectors $\hat{k}_{ut}(k)$ back to the user terminal, and this is within the scope of the invention.

The calibration scheme described above allows each user terminal to calibrate its transmit and receive chains in real time via over-the-air transmission. This allows user terminals with different frequency responses to achieve high performance without the need for tight frequency response specifications or to perform calibration at the factory. The access point may be calibrated by multiple user terminals to provide improved accuracy.

D. Gain Considerations

The calibration may be performed based on "normalized" gains for the downlink and uplink channels, which are gains given relative to the noise floor at the receiver. The use of the normalized gains allows the characteristics of one link (e.g., the channel gains and SNR per spatial channel) to be obtained based on gain measurements for the other link, after the downlink and uplink have been calibrated.

The access point and user terminal may initially balance their receiver input levels such that the noise levels on the receive paths for the access point and user terminal are approximately the same. The balancing may be done by estimating the noise floor, e.g., by finding a section of a received TDD frame (which is a unit of downlink/uplink transmission) that has a minimum average power over a particular time duration (e.g., one or two symbol periods). Generally, the time just before the start of each TDD frame is clear of transmissions, since any uplink data must be received by the access point and then a receive/transmit turnaround time is necessary before the access point transmits on the downlink. Depending on the interference environment, the noise floor may be determined based on a number of TDD frames. The downlink and uplink channel responses are then measured relative to this noise floor. More specifically, the channel gain for a given subband of a given transmit and receive antenna pair may first be obtained, for example, as the ratio of the received pilot symbol over the transmitted pilot symbol for that subband of that transmit and receive antenna pair. The normalized gain is then equal to the measured gain divided by the noise floor.

A large difference in the normalized gains for the access point and the normalized gains for the user terminal can result in the correction factors for the user terminal being greatly different from unity. The correction factors for the access point are close to unity because the first element of the matrix $\hat{K}_{ap}$ is set to 1.

If the correction factors for the user terminal differ greatly from unity, then the user terminal may not be able to apply the computed correction factors. This is because the user terminal has a constraint on its maximum transmit power and may not be capable of increasing its transmit power for large correction factors. Moreover, a reduction in transmit power for small correction factors is generally not desirable, since this may reduce the achievable data rate.

Thus, the user terminal can transmit using a scaled version of the computed correction factors. The scaled calibration factors may be obtained by scaling the computed correction factors by a particular scaling value, which may be set equal to a gain delta (difference or ratio) between the downlink and uplink channel responses. This gain delta can be computed as an average of the differences (or deltas) between the normalized gains for the downlink and uplink. The scaling value (or gain delta) used for the correction factors for the user terminal can be sent to the access point along with the computed correction factors for the access point.

With the correction factors and the scaling value or gain delta, the downlink channel characteristics may be determined from the measured uplink channel response, and vice versa. If the noise floor at either the access point or the user terminal changes, then the gain delta can be updated, and the updated gain delta may be sent in a message to the other entity.

In the above description, the calibration results in two sets (or vectors or matrices) of correction factors for each subband, with one set $\hat{K}_{ap}$ being used by the access point and the other set $\hat{K}_{ut}$ being used by the user terminal. The access point may apply its correction factors $\hat{K}_{ap}$ on the transmit side and/or the receive side, as described above. The user terminal may also apply its correction factors $\hat{K}_{ut}$ on the transmit side and/or the receive side. In general, the calibration is performed such that the calibrated downlink and uplink channel responses are reciprocal, regardless of where correction factors are applied.

2. MIMO Pilot

For the calibration, a MIMO pilot is transmitted on the uplink by the user terminal to allow the access point to estimate the uplink channel response, and a MIMO pilot is transmitted on the downlink by the access point to allow the user terminal to estimate the downlink channel response. A MIMO pilot is a pilot comprised of $N_T$ pilot transmissions sent from $N_T$ transmit antennas, where the pilot transmission from each transmit antenna is identifiable by the receiving station. The MIMO pilot may be generated and transmitted in various manners. The same or different MIMO pilots may be used for the downlink and uplink. In any case, the MIMO pilots used for the downlink and uplink are known at both the access point and user terminal.

In an embodiment, the MIMO pilot comprises a specific OFDM symbol (denoted as "P") that is transmitted from each of the $N_T$ transmit antennas, where $N_T=N_{ap}$ for the downlink and $N_T=N_{ut}$ for the uplink. For each transmit antenna, the same P OFDM symbol is transmitted in each symbol period designated for MIMO pilot transmission. However, the P OFDM symbols for each antenna are covered with a different N-chip Walsh sequence assigned to that antenna, where $N \geq N_{ap}$ for the downlink and $N \geq N_{ut}$ for the uplink. The Walsh covering maintains orthogonality between the $N_T$ transmit antennas and allows the receiver to distinguish the individual transmit antennas.

The P OFDM symbol includes one modulation symbol for each of the $N_{sb}$ designated subbands. The P OFDM symbol thus comprises a specific "word" of $N_{sb}$ modulation symbols that may be selected to facilitate channel estimation by the receiver. This word may also be defined to minimize the peak-to-average variation in the transmitted MIMO pilot. This may then reduce the amount of distortion and non-linearity generated by the transmit and receive chains, which may then result in improved accuracy for the channel estimation.

For clarity, a specific MIMO pilot is described below for a specific MIMO-OFDM system. For this system, the access point and user terminal each have four transmit/receive antennas. The system bandwidth is partitioned into 64 orthogonal subbands, or $N_F=64$, which are assigned indices of +31 to −32. Of these 64 subbands, 48 subbands (e.g., with indices of $\pm\{1, \ldots, 6, 8, \ldots, 20, 22, \ldots, 26\}$) are used for data, 4 subbands (e.g., with indices of $\pm\{7, 21\}$) are used for pilot and possibly signaling, the DC subband (with index of 0) is not used, and the remaining subbands are also not used and serve as guard subbands. This OFDM subband structure is described in further detail in a document for IEEE Standard 802.11a and entitled "Part 11: Wireless LAN Medium Access Control (MAC) and Physical Layer (PHY) specifications: High-speed Physical Layer in the 5 GHz Band," September 1999, which is publicly available.

The P OFDM symbol includes a set of 52 QPSK modulation symbols for the 48 data subbands and 4 pilot subbands. This P OFDM symbol may be given as follows:

P(real)=g·{0,0,0,0,0,0,−1,−1,−1,−1,1,1,1,1,−1,−1,1,−1,1,1,1,
1,1,−1,−1,1,1,−1,1,1,−1,−1,1,1,−1,
0,1,−1,−1,−1,−1,1,1,−1,−1,−1,−1,1,1,1,−1,−1,1,1,−1,1,1,
1,−,1,−1,1,−0,0,0,0,0}, P(imag)=g·{0,0,0,0,0,0,−1,1,1,1,−1,−1,1,−1,1,1,1,−1,−
    1,−1,−1,−1,−1,−1,1,1,−1,1,1,−1,1, 0,−1,−1,−1,−1,1,1,−,
    1,−1,−1,1,−,1,−1,1,1,1,−1,1,1,1,1,1,1,−1,−1,0,0,0,0,0}, where g is a gain for the pilot. The values within the { } bracket are given for subband indices −32 through −1 (for the first line) and 0 through +31 (for the second line). Thus, the first line for P(real) and P(imag) indicates that symbol −1−j) is transmitted in subband −26, symbol (−1+j) is transmitted in subband −25, and so on. The second line for P(real) and P(imag) indicates that symbol (1−j) is transmitted in subband 1, symbol (−1−j) is transmitted in subband 2, and so on. Other OFDM symbols may also be used for the MIMO pilot.

In an embodiment, the four transmit antennas are assigned Walsh sequences of $W_1=1111$, $W_2=1010$, $W_3=1100$, and $W_4=1001$ for the MIMO pilot. For a given Walsh sequence, a value of "1" indicates that a P OFDM symbol is transmitted and a value of "0" indicates that a −P OFDM symbol is transmitted (i.e., each of the 52 modulation symbols in P is inverted).

Table 2 lists the OFDM symbols transmitted from each of the four transmit antennas for a MIMO pilot transmission that spans four symbol periods, or $N_{ps}=4$.

TABLE 2

| OFDM symbol | Antenna 1 | Antenna 2 | Antenna 3 | Antenna 4 |
|---|---|---|---|---|
| 1 | +P | +P | +P | +P |
| 2 | +P | −P | +P | −P |
| 3 | +P | +P | −P | −P |
| 4 | +P | −P | −P | +P |

For longer MIMO pilot transmission, the Walsh sequence for each transmit antenna is simply repeated. For this set of Walsh sequences, the MIMO pilot transmission occurs in integer multiples of four symbol periods to ensure orthogonality among the four transmit antennas.

The receiver may derive an estimate of the channel response based on the received MIMO pilot by performing the complementary processing. In particular, to recover the pilot sent from transmit antenna i and received by receive antenna j, the pilot received by receive antenna j is first processed with the Walsh sequence assigned to transmit antenna i in a complementary manner to the Walsh covering performed at the transmitter. The decovered OFDM symbols for all $N_{ps}$ symbol periods for the MIMO pilot are then accumulated, where the accumulation is performed individually for each of the 52 subbands used to carry the MIMO pilot. The result of the accumulation is $\hat{h}_{i,j}(k)$, for $k=\pm 1, \ldots, 26$, which is an estimate of the effective channel response from transmit antenna i to receive antenna j, including the responses for the transmit and receive chains, for the 52 data and pilot subbands.

The same processing may be performed to recover the pilot from each transmit antenna at each receive antenna. The pilot processing provides $N_{ap} \cdot N_{ut}$ values that are the elements of the effective channel response estimate, $\hat{H}_{up}(k)$ or $\hat{H}_{dn}(k)$, for each of the 52 subbands.

In another embodiment, a Fourier matrix F is used for the MIMO pilot. The Fourier matrix may have any square dimension, e.g., 3×3, 4×4, 5×5, and so on. The elements of an N×N Fourier matrix may be expressed as:

$$f_{n,m} = e^{-j2\pi \frac{(n-1)(m-1)}{N}},$$

for n=1, ..., N and m=1, ..., N.
Each transmit antenna is assigned one column of F. The elements in the assigned column are used to multiply the pilot symbols in different time intervals, in similar manner as the elements of a Walsh sequence. In general, any orthonormal matrix whose elements have unity magnitude may be used to multiply the pilot symbols for the MIMO pilot.

In yet another embodiment that is applicable for a MIMO-OFDM system, the subbands available for transmission are divided into $N_T$ non-overlapping or disjoint subsets. For each transmit antenna, pilot symbols are sent on one subset of subbands in each time interval. Each transmit antenna can cycle through the $N_T$ subsets in $N_T$ time intervals, which corresponds to the duration of the MIMO pilot. The MIMO pilot may also be transmitted in other manners.

Regardless of how the MIMO pilot may be transmitted, the channel estimation may be performed by both the access point and the user terminal during calibration to obtain the effective uplink channel response estimate $\hat{H}_{up}(k)$ and the effective downlink channel response estimate $\hat{H}_{dn}(k)$, respectively, which are then used to derive the correction factors, as described above.

3. Spatial Processing

The correlation between the downlink and uplink channel responses may be exploited to simplify channel estimation and spatial processing at the access point and the user terminal for a TDD MIMO system and a TDD MIMO-OFDM system. This simplification is possible after calibration has been performed to account for differences in the transmit and receive chains. As noted above, the calibrated channel responses are:

$$\underline{H}_{cdn}(k) = \hat{K}_{ut}(k) \underline{H}_{dn}(k) \hat{K}_{ap}(k), \text{ for the downlink, and} \quad \text{Eq (26a)}$$

$$\underline{H}_{cup}(k) = \hat{K}_{ap}(k) \underline{H}_{up}(k) \hat{K}_{ut}(k) \approx \underline{H}_{cdn}^T(k), \text{ for the uplink.} \quad \text{Eq (26b)}$$

The approximation for the last equality in equation (26b) is due to the use of estimates of the actual correction factors.

The channel response matrix H(k) for each subband may be "diagonalized" to obtain the $N_S$ eigenmodes for that subband. The eigenmodes may be viewed as orthogonal spatial channels. This diagonalization may be achieved by performing either singular value decomposition of the channel response matrix H(k) or eigenvalue decomposition of the correlation matrix of H(k), which is $R(k) = H^H(k)H(k)$.

The singular value decomposition of the calibrated uplink channel response matrix, $\underline{H}_{cup}(k)$, may be expressed as:

$$\underline{H}_{cup}(k) = \underline{U}_{ap}(k) \underline{\Sigma}(k) \underline{V}_{ut}^H(k), \text{ for } k \in K, \quad \text{Eq (27)}$$

where
  $\underline{U}_{ap}(k)$ is an $N_{ut} \times N_{ut}$ unitary matrix of left eigenvectors of $\underline{H}_{cup}(k)$;
  $\underline{\Sigma}(k)$ is an $N_{ut} \times N_{ap}$ diagonal matrix of singular values of $\underline{H}_{cup}(k)$; and
  $\underline{V}_{ut}(k)$ is an $N_{ap} \times N_{ap}$ unitary matrix of right eigenvectors of $\underline{H}_{cup}(k)$.

A unitary matrix M is characterized by the property $M^H M = I$. Correspondingly, the singular value decomposition of the calibrated downlink channel response matrix, $\underline{H}_{cdn}(k)$, may be expressed as:

$$\underline{H}_{cdn}(k) = \underline{V}_{ut}^*(k) \underline{\Sigma}(k) \underline{U}_{ap}^T(k), \text{ for } k \in K. \quad \text{Eq (28)}$$

The matrices $\underline{V}_{ut}^*(k)$ and $\underline{U}_{ap}^*(k)$ are thus also matrices of left and right eigenvectors, respectively, of $\underline{H}_{cdn}(k)$, where "*" denotes a complex conjugate. The matrices $\underline{V}_{ut}(k)$, $\underline{V}_{ut}^*(k)$, $\underline{V}_{ut}^T(k)$, and $\underline{V}_{ut}^H(k)$ are different forms of the matrix $\underline{V}_{ut}(k)$, and the matrices $\underline{U}_{ap}(k)$, $\underline{U}_{ap}^*(k)$, $\underline{U}_{ap}^T(k)$, and $\underline{U}_{ap}^H(k)$ are also different forms of the matrix $\underline{U}_{ap}(k)$. For simplicity, reference to the matrices $\underline{U}_{ap}(k)$ and $\underline{V}_{ut}(k)$ in the following description may also refer to their various other forms. The matrices $\underline{U}_{ap}(k)$ and $\underline{V}_{ut}(k)$ are used by the access point and user terminal, respectively, for spatial processing and are denoted as such by their subscripts.

The singular value decomposition is described in further detail by Gilbert Strang in a book entitled "Linear Algebra and Its Applications," Second Edition, Academic Press, 1980, which is incorporated herein by reference.

The user terminal can estimate the calibrated downlink channel response based on a MIMO pilot sent by the access point. The user terminal may then perform singular value decomposition of the calibrated downlink channel response estimate $\hat{H}_{cdn}(k)$, for $k \in K$, to obtain the diagonal matrices $\hat{\Sigma}(k)$ and the matrices $\hat{V}^*_{ut}(k)$ of left eigenvectors of $\hat{H}_{cdn}(k)$, for $k \in K$. This singular value decomposition may be given as $\hat{H}_{cdn}(k) = \hat{V}^*_{ut}(k)\hat{\Sigma}(k)\hat{U}_{ap}^T(k)$, where the hat ("^") above each matrix indicates that it is an estimate of the actual matrix.

Similarly, the access point can estimate the calibrated uplink channel response based on a MIMO pilot sent by the user terminal. The access point may then perform singular value decomposition of the calibrated uplink channel response estimate $\hat{H}_{cup}(k)$, for $k \in K$, to obtain the diagonal matrices $\hat{\Sigma}(k)$ and the matrices $\hat{U}_{ap}(k)$ of left eigenvectors of $\hat{H}_{cup}(k)$ for $k \in K$. This singular value decomposition may be given as $\hat{H}_{cup}(k) = \hat{U}_{ap}(k)\hat{\Sigma}(k)\hat{V}_{ut}^H(k)$.

Because of the reciprocal channel and the calibration, the singular value decomposition only needs to be performed by either the user terminal or the access point to obtain both matrices $\hat{V}_{ut}(k)$ and $\hat{U}_{ap}(k)$. If performed by the user terminal, then the matrices $\hat{V}_{ut}(k)$ are used for spatial processing at the user terminal and the matrices $\hat{U}_{ap}(k)$ may be sent back to the access point.

The access point may also be able to obtain the matrices $\hat{U}_{ap}(k)$ and $\hat{\Sigma}(k)$ based on a steered reference sent by the user terminal. Similarly, the user terminal may also be able to obtain the matrices $\hat{V}_{ut}(k)$ and $\hat{\Sigma}(k)$ based on a steered reference sent by the access point. The steered reference is described in detail in commonly assigned U.S. patent application Ser. No. 10/693,419, entitled "MIMO WLAN System", filed Oct. 23, 2003.

The matrices $\hat{U}_{ap}(k)$ and $\hat{V}_{ut}(k)$ may be used to transmit independent data streams on the $N_S$ eigenmodes of the MIMO channel, where $N_S \leq \min\{N_{ap}, N_{ut}\}$. The spatial processing to transmit multiple data streams on the downlink and uplink is described below.

A. Uplink Spatial Processing

The spatial processing by the user terminal for uplink transmission may be expressed as:

$$\underline{x}_{up}(k) = \hat{K}_{ut}(k)\hat{V}_{ut}(k)\underline{s}_{up}(k), \text{ for } k \in K, \quad \text{Eq (29)}$$

where $\underline{x}_{up}(k)$ is the transmit vector for the uplink for subband k; and $\underline{s}_{up}(k)$ is a data vector with up to $N_S$ non-zero entries for the modulation symbols to be transmitted on the $N_S$ eigenmodes of subband k.

Additional processing may also be performed on the modulation symbols prior to transmission. For example, channel inversion may be applied across the data subbands (e.g., for each eigenmode) such that the received SNR is approximately equal for all data subbands. The spatial processing may then be expressed as:

$$\underline{x}_{up}(k) = \hat{K}_{ut}(k)\hat{V}_{ut}(k)W_{up}(k)\underline{s}_{up}(k), \text{ for } k \in K, \quad \text{Eq (30)}$$

where $W_{up}(k)$ is a matrix with weights for the (optional) uplink channel inversion.

The channel inversion may also be performed by assigning transmit power to each subband before the modulation takes place, in which case the vector $\underline{s}_{up}(k)$ includes the channel inversion coefficients and the matrix $W_{up}(k)$ can be omitted from equation (30). In the following description, the use of the matrix $W_{up}(k)$ in an equation indicates that the channel inversion coefficients are not incorporated into the vector $\underline{s}_{up}(k)$. The lack of the matrix $W_{up}(k)$ in an equation can indicate either (1) channel inversion is not performed or (2) channel inversion is performed and incorporated into the vector $\underline{s}_{up}(k)$.

Channel inversion may be performed as described in the aforementioned U.S. patent application Ser. No. 10/693,419 and in commonly assigned U.S. patent application Ser. No. 10/229,209, entitled "Coded MIMO Systems with Selective Channel Inversion Applied Per Eigenmode," filed Aug. 27, 2002.

The received uplink transmission at the access point may be expressed as:

$$\underline{r}_{up}(k) = \hat{K}_{rap}(k)\underline{H}_{up}(k)\underline{x}_{up}(k) + n(k), \text{ for } k \in K, \quad \text{Eq (31)}$$

where $\underline{r}_{up}(k)$ is the received vector for the uplink for subband k;

$n(k)$ is additive white Gaussian noise (AWGN) for subband k; and $\underline{x}_{up}(k)$ is as shown in equation (29).

The receiver spatial processing (or spatial matched filtering) at the access point for the received uplink transmission may be expressed as:

$$\begin{aligned}\hat{\underline{s}}_{up}(k) &= \hat{\Sigma}^{-1}(k)\hat{\underline{U}}_{ap}^H(k)\underline{r}_{up}(k), \\ &= \hat{\Sigma}^{-1}(k)\hat{\underline{U}}_{ap}^H(k)\left(\hat{K}_{rap}(k)\underline{H}_{up}(k)\hat{K}_{tut}(k)\hat{\underline{V}}_{ut}(k)\underline{s}_{up}(k) + \underline{n}(k)\right), \\ &= \hat{\Sigma}^{-1}(k)\hat{\underline{U}}_{ap}^H(k)\underline{U}_{ap}(k)\Sigma(k)\hat{\underline{V}}_{ut}(k) + \tilde{\underline{n}}(k), \text{ for } k \in K, \\ &= \underline{s}_{up}(k) + \tilde{\underline{n}}(k),\end{aligned} \quad \text{Eq (32)}$$

where $\hat{\underline{s}}_{up}(k)$ is an estimate of the data vector $\underline{s}_{up}(k)$ transmitted by the user terminal on the uplink, and $\tilde{n}(k)$ is the post-processed noise. Equation (32) assumes that channel inversion was not performed at the user terminal, the transmit vector $\underline{x}_{up}(k)$ is as shown in equation (29), and the received vector $\underline{r}_{up}(k)$ is as shown in equation (31).

B. Downlink Spatial Processing

The spatial processing by the access point for downlink transmission may be expressed as:

$$\underline{x}_{dn}(k) = \hat{K}_{tap}(k)\hat{\underline{U}}^*_{ap}(k)\underline{s}_{dn}(k), \text{ for } k \in K, \quad \text{Eq (33)}$$

where $\underline{x}_{dn}(k)$ is the transmit vector and $\underline{s}_{dn}(k)$ is the data vector for the downlink.

Again, additional processing (e.g., channel inversion) may also be performed on the modulation symbols prior to transmission. The spatial processing may then be expressed as:

$$\underline{x}_{dn}(k) = \hat{K}_{tap}(k)\hat{\underline{U}}^*_{ap}(k)W_{dn}(k)\underline{s}_{dn}(k), \text{ for } k \in K, \quad \text{Eq (34)}$$

where $W_{dn}(k)$ is a matrix with weights for the (optional) downlink channel inversion.

The received downlink transmission at the user terminal may be expressed as:

$$\underline{r}_{dn}(k) = \hat{K}_{rut}(k)\underline{H}_{dn}(k)\underline{x}_{dn}(k) + n(k), \text{ for } k \in K. \quad \text{Eq (35)}$$

The receiver spatial processing (or spatial matched filtering) at the user terminal for the received downlink transmission may be expressed as:

$$\hat{s}_{dn}(k) = \hat{\Sigma}^{-1}(k)\hat{V}_{ut}^T(k)r_{dn}(k), \quad\quad \text{Eq (36)}$$

$$= \hat{\Sigma}^{-1}(k)\hat{V}_{ut}^T(k)\hat{K}_{rut}(k)H_{dn}(k)\hat{K}_{tap}(k)\hat{U}_{ap}^*(k)s_{dn}(k) +$$

$$\underline{n}(k), \quad \text{for } k \in K$$

$$= \hat{\Sigma}^{-1}(k)\hat{V}_{ut}^T(k)\underline{V}_{ut}^*(k)\Sigma(k)\underline{U}_{ap}^T(k)\hat{U}_{ap}^*s_{dn}(k) + \underline{n}(k),$$

$$= s_{dn}(k) + \tilde{n}(k),$$

Equation (36) assumes that channel inversion was not performed at the access point, the transmit vector $x_{dn}(k)$ is as shown in equation (33), and the received vector $\bar{r}_{dn}(k)$ is as shown in equation (35).

Table 3 summarizes the spatial processing at the access point and the user terminal for data transmission and reception. Table 3 assumes that the additional processing by $W(k)$ is performed at the transmitter. However, if this additional processing is not performed, then $W(k)$ is simply equal to the identity matrix.

TABLE 3

|  | Uplink | Downlink |
|---|---|---|
| User Terminal | Transmit: $\underline{x}_{up}(k) = \hat{\underline{K}}_{tut}(k)\hat{\underline{V}}_{ut}(k)\underline{W}_{up}(k)\underline{s}_{up}(k)$ | Receive: $\hat{\underline{s}}_{dn}(k) = \hat{\underline{\Sigma}}^{-1}(k)\hat{\underline{V}}^T_{ut}(k)\hat{\underline{K}}_{rut}(k)r_{dn}(k)$ |
| Access Point | Receive: $\hat{\underline{s}}_{up}(k) = \hat{\underline{\Sigma}}^{-1}(k)\hat{\underline{U}}^H_{ap}(k)\hat{\underline{K}}_{rap}(k)r_{up}(k)$ | Transmit: $\underline{x}_{dn}(k) = \hat{\underline{K}}_{tap}(k)\hat{\underline{U}}^*_{ap}(k)\underline{W}_{dn}(k)\underline{s}_{dn}(k)$ |

In the above description and as shown in Table 3, the correction matrices $\hat{K}_{tap}(k)$ and $\hat{K}_{rap}(k)$ are used for the transmit side and receive side, respectively, at the access point. One of these two correction matrices may be set equal to the identity matrix. The correction matrices $\hat{K}_{tut}(k)$ and $\hat{K}_{rut}(k)$ are used for the transmit side and receive side, respectively, at the user terminal. One of these two correction matrices may also be set equal to the identity matrix. The correction matrices $\hat{K}_{tap}(k)$ and $\hat{K}_{tut}(k)$ may be combined with the weight matrices $\underline{W}_{dn}(k)$ and $\underline{W}_{up}(k)$ to obtaining a in matrices $\underline{G}_{dn}(k)$ and $\underline{G}_{up}(k)$, where $\underline{G}_{dn}(k) = \hat{\underline{K}}_{tap}(k)\underline{W}_{dn}(k)$ and $\underline{G}_{up}(k) = \hat{\underline{K}}_{tut}(k)\underline{W}_{up}(k)$.

C. Data Transmission on One Link

Data transmission on a given link may also be achieved by applying correction matrices at a transmitting station and using an MMSE receiver at a receiving station. For example, data transmission on the downlink may be achieved by applying the correction factors on only the transmit side at the access point and using the MMSE receiver at the user terminal. For simplicity, the description is for a single subband and the subband index k is omitted in the equations. The calibrated downlink and uplink channel responses may be given as:

$$\underline{H}_{cup} = \underline{R}_{ap}\underline{H}^T\underline{T}_{ut} = \underline{H}_{up}, \text{ and} \quad\quad \text{Eq(37)}$$

$$\underline{H}_{cdn} = \underline{K}_u^{-1}\underline{R}_{ut}\underline{H}\underline{T}_{ap}\underline{K}_{ap} = \underline{K}_{ut}^{-1}\underline{H}_{dn}\underline{K}_{ap} = \underline{H}_{cup}^T. \quad\quad \text{Eq (38)}$$

The user terminal transmits a pilot on the uplink, which is used by the access point to derive an estimate of the uplink channel response. The access point performs singular value decomposition of the uplink channel response estimate $\hat{H}_{cup}$, as shown in equation (27), and derives the matrix $\hat{U}_{ap}$. The access point then uses $\hat{U}_{ap}$ for spatial processing to transmit data on the eigenmodes of the MIMO channel, as shown in equation (33).

The received downlink transmission at the user terminal may be expressed as:

$$\underline{r}_{dn} = \underline{H}_{dn}\underline{x}_{dn} + n. \quad\quad \text{Eq (39)}$$

Equation (39) indicates that the correction factors are not applied at the user terminal. The user terminal derives an MMSE spatial filter matrix $\underline{M}$, as follows:

$$\underline{M} = \underline{H}_{edn}^H[\underline{H}_{edn}\underline{H}_{edn}^H + \underline{\phi}_{nn}]^{-1}, \quad\quad \text{Eq (40)}$$

where $\underline{H}_{edn} = \underline{R}_{ut}\underline{H}\ \underline{T}_{ap}\hat{\underline{K}}ap\hat{\underline{U}}^*_{ap} = \underline{H}_{dn}\hat{\underline{K}}_{ap}\hat{\underline{U}}^*_{ap}$; and
$\underline{\phi}_{nn}$ is the autocovariance matrix of the noise.

If the noise is AWGN, then $\underline{\phi}_{nn} = \sigma_n^2\underline{I}$, where $\sigma_n^2$ is the variance of the noise. The user terminal may derive $\underline{H}_{edn}$ based on a pilot transmitted along with the data by the access point.

The user terminal then performs MMSE spatial processing as follows:

$$\hat{s}_{mmse} = \underline{M}r_{dn}, \quad\quad \text{Eq (41)}$$

$$= \underline{M}(\underline{H}_{dn}\hat{\underline{K}}_{ap}\hat{\underline{U}}^*_{ap}s_{dn} + n),$$

-continued $$= \underline{M}\underline{H}_{edn}s_{dn} + \underline{M}n,$$

$$= s_{dn} + n_{mmse},$$

where $n_{mmse}$ includes the MMSE filtered noise and residual crosstalk, and $\hat{s}_{mmse}$ is an estimate of the data vector $s_{dn}$. The symbol estimates from the MMSE spatial filter matrix $\underline{M}$ are unnormalized estimates of the data symbols. The user terminal may multiply $\hat{s}_{mmse}$ with a scaling matrix $\underline{D}$, which is $\underline{D} = [\text{diag }[\underline{M}\underline{H}_{edn}]]^{-1}$, to obtain normalized estimates of the data symbols.

If the user terminal applies the correction matrix $\underline{K}_{rut} = \underline{K}_{ut}^{-1}$ on its receive side, then the overall downlink channel response would be $\underline{H}_{odn} = \underline{K}_{rut}\underline{H}_{edn}$. The MMSE spatial filter matrix $\tilde{\underline{M}}$, with the correction matrix $\underline{K}_{rut}$ applied on the receive side at the user terminal, may be expressed as:

$$\tilde{\underline{M}} = \underline{H}_{edn}^H\underline{K}_{rut}^H[\underline{K}_{rut}\underline{H}_{edn}\underline{H}_{edn}^H\underline{K}_{rut}^H + \underline{K}_{rut}\underline{\phi}_{nn}\underline{K}_{rut}^H]^{-1}, \quad\quad \text{Eq (42)}$$

The inverse quantity in equation (42) may be rearranged as follows:

$$[\underline{K}_{rut}\underline{H}_{edn}\underline{H}_{edn}^H\underline{K}_{rut}^H + \underline{K}_{rut}\underline{\phi}_{nn}\underline{K}_{rut}^H]^{-1} = [\underline{K}_{rut}(\underline{H}_{edn}\underline{H}_{edn}^H + \quad\quad \text{Eq (43)}$$

$$\underline{\phi}_{nn})\underline{K}_{rut}^H]^{-1},$$

$$(\underline{K}_{rut}^H)^{-1}(\underline{H}_{edn}\underline{H}_{edn}^H +$$

$$\underline{\phi}_{nn})^{-1}\underline{K}_{rut}^{-1}.$$

Substituting equation (43) into equation (42), the following is obtained:

$$\tilde{\underline{M}} = \underline{M}\underline{K}_{rut}^{-1}. \quad\quad \text{Eq (44)}$$

The received downlink transmission at the user terminal, with the correction matrix $\underline{K}_{rut}$ applied on the receive side at the user terminal, may be expressed as:

$$\tilde{r}_{dn} = \underline{K}_{rut}\underline{H}_{dn}\underline{x}_{dn} + n = \underline{K}_{rut}\underline{r}_{dn}. \quad\quad \text{Eq (45)}$$

The user terminal then performs MMSE spatial processing as follows:

$$\hat{\underline{s}}_{mmse} = \tilde{M} \tilde{r}_{dn} = \underline{MK}_{rut}^{-1} \underline{K}_{rut} \underline{r}_{dn} = \underline{Mr}_{dn} = \hat{\underline{s}}_{mmse}. \quad \text{Eq (46)}$$

Equations (45) and (46) indicate that the user terminal can obtain the same performance with the MMSE receiver regardless of whether the correction factors are applied at the user terminal. The MMSE processing implicitly accounts for any mismatch between the transmit and receive chains at the user terminal. The MMSE spatial matched filter is derived with $\underline{H}_{edn}$ if the correction factors are not applied on the receive side at the user terminal and with $\underline{H}_{odn}$ if the correction factors are applied.

Similarly, data transmission on the uplink may be achieved by applying correction matrices on the transmit side and/or the receive side at the user terminal and using the MMSE receiver at the access point.

4. MIMO-OFDM System

Figure 5:
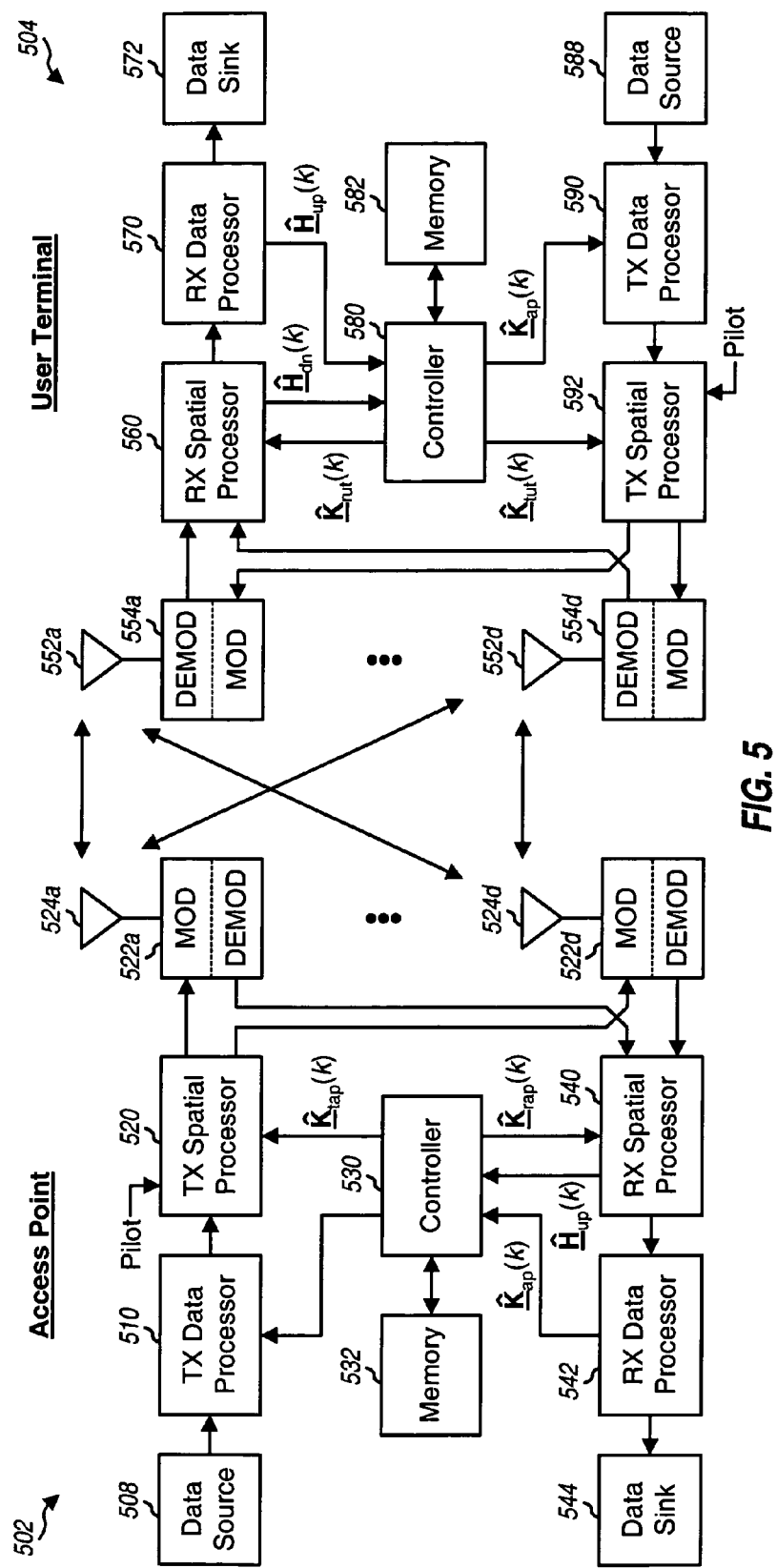
FIG. 5 is a block diagram of the access point and the user terminal.

FIG. 5 shows a block diagram of an embodiment of an access point 502 and a user terminal 504 within a TDD MIMO-OFDM system. For simplicity, the following description assumes that the access point and user terminal are each equipped with four antennas that may be used for data transmission and reception.

On the downlink, at access point 502, a transmit (TX) data processor 510 receives traffic data (i.e., information bits) from a data source 508 and signaling and other information from a controller 530. TX data processor 510 formats, encodes, interleaves, and modulates (i.e., symbol maps) the received data and generates a stream of modulation symbols for each spatial channel used for data transmission. A TX spatial processor 520 receives the modulation symbol streams from TX data processor 510 and performs spatial processing to provide four streams of transmit symbols, one stream for each antenna. TX spatial processor 520 also multiplexes in pilot symbols as appropriate (e.g., for calibration).

Each modulator (MOD) 522 receives and processes a respective transmit symbol stream to generate a corresponding stream of OFDM symbols. Each OFDM symbol stream is further processed by a transmit chain within modulator 522 to generate a corresponding downlink modulated signal. The four downlink modulated signals from modulator 522a through 522d are then transmitted from four antennas 524a through 524d, respectively.

At user terminal 504, antennas 552 receive the transmitted downlink modulated signals, and each antenna provides a received signal to a respective demodulator (DEMOD) 554. Each demodulator 554 (which includes a receive chain) performs processing complementary to that performed at modulator 522 and provides received symbols. A receive (RX) spatial processor 560 performs spatial processing on the received symbols from all demodulators 554 and provides recovered symbols, which are estimates of the modulation symbols sent by the access point. An RX data processor 570 processes (e.g., symbol demaps, deinterleaves, and decodes) the recovered symbols and provides decoded data. The decoded data may include recovered traffic data, signaling, and so on, which are provided to a data sink 572 for storage and/or a controller 580 for further processing.

Controllers 530 and 580 control the operation of various processing units at the access point and user terminal, respectively. Memory units 532 and 582 store data and program codes used by controllers 530 and 580, respectively.

During calibration, RX spatial processor 560 provides a downlink channel response estimate, $\hat{H}_{dn}(k)$, which is derived based on the MIMO pilot transmitted by the access point. RX data processor 570 provides the uplink channel response estimate, $\hat{H}_{up}(k)$, which is derived by the access point and sent on the downlink. Controller 580 receives the channel response estimates $\hat{H}_{dn}(k)$ and $\hat{H}_{up}(k)$, derives the correction matrices $\hat{K}_{ap}(k)$ and $\hat{K}_{ut}(k)$, and provides the matrices $\hat{K}_{ap}(k)$ to a TX data processor 590 for transmission back to the access point. Controller 580 further derives correction matrices $\hat{K}_{rut}(k)$ and $\hat{K}_{rut}(k)$ based on the correction matrices $\hat{K}_{ut}(k)$, where either $\hat{K}_{tut}(k)$ or $\hat{K}_{rut}(k)$ may be an identity matrix, provides the correction matrices $\hat{K}_{ut}(k)$ to a TX spatial processor 592, and provides correction matrices $\hat{K}_{rut}(k)$ to RX spatial processor 560.

The processing for the uplink may be the same or different from the processing for the downlink. Data and signaling received from data source 588 are processed (e.g., encoded, interleaved, and modulated) by TX data processor 590 and further spatially processed by TX spatial processor 592, which also multiplexes in pilot symbols. The pilot and modulation symbols are further processed by modulators 554 to generate uplink modulated signals, which are then transmitted via antennas 552 to the access point.

At access point 502, the uplink modulated signals are received by antennas 524, demodulated by demodulators 522, processed by an RX spatial processor 540 and an RX data processor 542 in a manner that is complementary to the processing performed by the user terminal, and provided to a data sink 544. During calibration, RX spatial processor 560 provides an uplink channel estimate, $\hat{H}_{up}(k)$, which is derived based on the MIMO pilot transmitted by the user terminal. The matrices $\hat{H}_{up}(k)$ are received by controller 530 and provided to TX data processor 510 for transmission to the user terminal.

Figure 6:
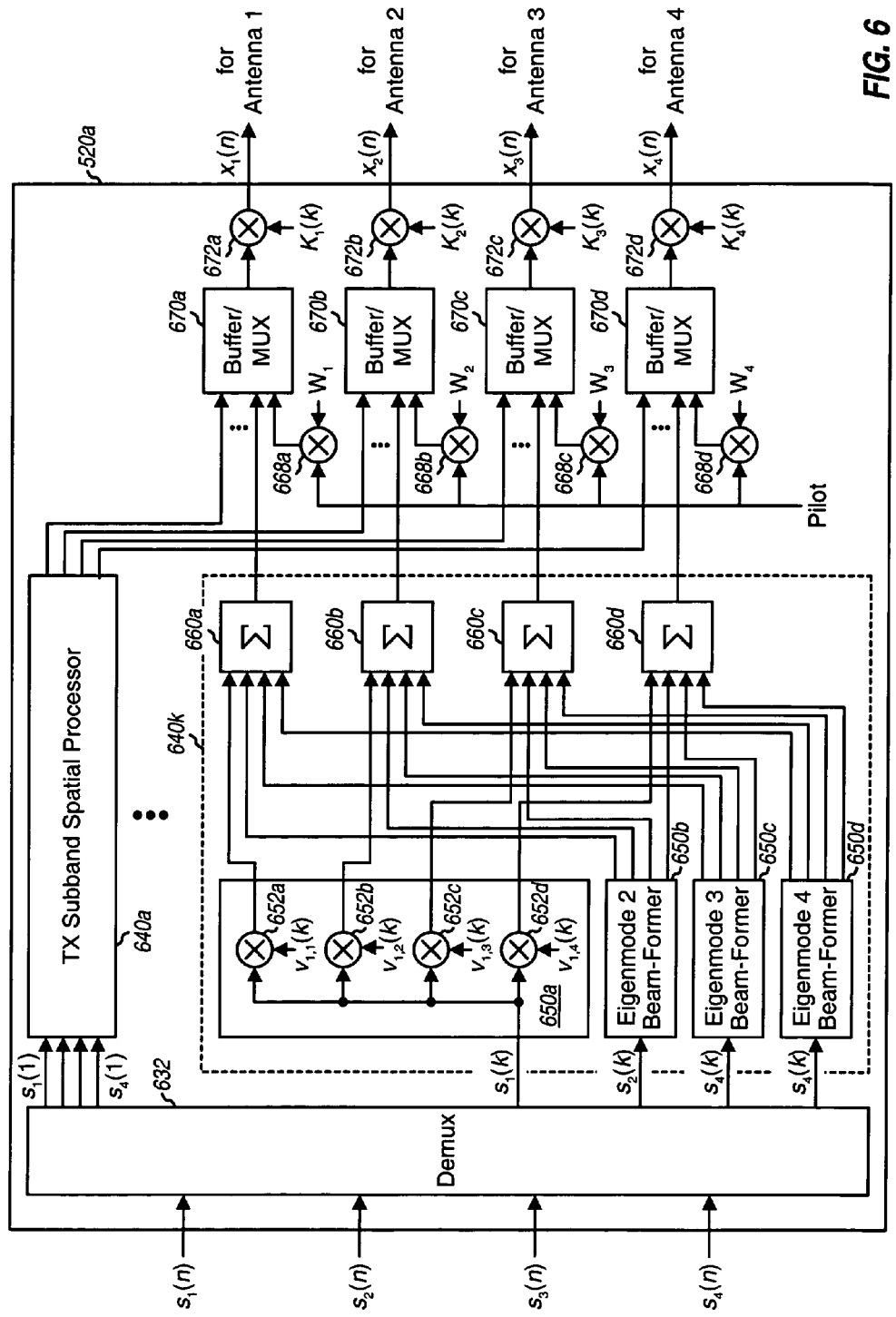
FIG. 6 is a block diagram of a transmit (TX) spatial processor.

FIG. 6 shows a block diagram of a TX spatial processor 520a, which may be used for TX spatial processors 520 and 592 in FIG. 5. For simplicity, the following description assumes that all four eigenmodes are selected for use.

Within processor 520a, a demultiplexer 632 receives four modulation symbol steams (which are denoted as $s_1(n)$ through $s_4(n)$) to be transmitted on four eigenmodes, demultiplexes each stream into $N_D$ substreams for the $N_D$ data subbands, and provides four modulation symbol substreams for each data subband to a respective TX subband spatial processor 640. Each processor 640 performs the processing, e.g., as shown in equation (29), (30), (33), or (34) for one subband.

Within each TX subband spatial processor 640, the four modulation symbol substreams (which are denoted as $s_1(k)$ through $s_4(k)$) are provided to four beam-formers 650a through 650d for the four eigenmodes of the associated subband. Each beam-former 650 performs beam-forming to transmit one symbol substream on one eigenmode of one subband. Each beam-former 650 receives one symbol substream $s_m(k)$ and performs beam-forming using the eigenvector $v_m(k)$ for the associated eigenmode. Within each beam-former 650, the modulation symbols are provided to four multipliers 652a through 652d, which also receive four elements, $v_{m,1}(k)$, $v_{m,2}(k)$, $v_{m,3}(k)$, and $v_{m,4}(k)$, of the eigenvector $v_m(k)$ for the associated eigenmode. Eigenvector $v_m(k)$ is the m-th column of the matrix $\hat{U}^*_{ap}(k)$ for the downlink and is the m-th column of the matrix $\hat{V}_{ut}(k)$ for the uplink. Each multiplier 652 multiplies the scaled modulation symbols with its eigenvector value $v_{m,j}(k)$ and provides "beam-formed" symbols. Multipliers 652a through 652d provide four beam-formed symbol substreams (which are to be transmitted from four antennas) to summers 660a through 660d, respectively.

Each summer 660 receives and sums four beam-formed symbols for the four eigenmodes for each symbol period and provides a preconditioned symbol for an associated transmit antenna. Summers 660a through 660d provides four substreams of preconditioned symbols for four transmit antennas to buffers/multiplexers 670a through 670d, respectively. Each buffer/multiplexer 670 receives pilot symbols and the preconditioned symbols from TX subband spatial processors 640 for the $N_D$ data subbands. Each buffer/multiplexer 670 then multiplexes pilot symbols, preconditioned symbols, and zero symbols for the pilot subbands, data subbands, and unused subbands, respectively, to form a sequence of $N_F$ symbols for that symbol period. During calibration, pilot symbols are transmitted on the designated subbands. Multipliers 668a through 668d cover the pilot symbols for the four antennas with Walsh sequences $W_1$ through $W_4$, respectively, assigned to the four antennas, as described above and shown in Table 2. Each buffer/multiplexer 670 provides a stream of symbols to a respective multiplier 672.

Multipliers 672a through 672d also receive the correction factors $K_1(k)$, $K_2(k)$, $K_3(k)$, and $K_4(k)$, respectively. The correction factors for each data subband k are the diagonal elements of $\hat{K}_{tap}(k)$ for the downlink and the diagonal elements of $\hat{K}_{tut}(k)$ for the uplink. Each multiplier 672 scales its input symbols with its correction factor $K_m(k)$ and provides transmit symbols. Multipliers 672a through 672d provides four transmit symbol streams for the four transmit antennas.

The spatial processing and OFDM modulation is described in further detail in the aforementioned U.S. patent application Ser. No. 10/693,419.

The calibration techniques described herein may be implemented by various means. For example, these techniques may be implemented in hardware, software, or a combination thereof. For a hardware implementation, the calibration techniques may be implemented at the access point and user terminal within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the calibration techniques may be implemented with modules (e.g., procedures, functions, and so on) that perform the functions described herein. The software codes may be stored in a memory unit (e.g., memory units 532 and 582 in FIG. 5) and executed by a processor (e.g., controllers 530 and 580, as appropriate). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of calibrating communication links in a wireless time division duplexed (TDD) communication system, comprising:
   deriving, by a first station, a channel response estimate for a downlink channel from a second station to the first station;
   receiving, from the second station, a channel response estimate for an uplink channel from the first station to the second station; and
   determining correction factors for the second station and correction factors for the first station based on the channel response estimates for the downlink and uplink channels, the correction factors for the second station and the correction factors for the first station being used to obtain a calibrated downlink channel response and a calibrated uplink channel response.

2. The method of claim 1, wherein the first station comprises an access point, the method further comprising:
   applying the correction factors for the access point on a transmit side, or a receive side, or both the transmit and receive sides at the access point.

3. The method of claim 1, wherein the first station comprises a user terminal, the method further comprising:
   applying the correction factors for the user terminal on a transmit side, or a receive side, or both the transmit and receive sides at the user terminal.

4. The method of claim 1, wherein the determining the correction factors for the second station and the correction factors for the first station comprises
   determining the correction factors for the second station and the correction factors for the first station based on the following equation:

$$\hat{\underline{H}}_{up}\hat{\underline{K}}_{ut} = (\hat{\underline{H}}_{dn}\hat{\underline{K}}_{ap})^T,$$

where
$\hat{\underline{H}}_{dn}$ is a matrix for the channel response estimate for the downlink channel,
$\hat{\underline{H}}_{up}$ is a matrix for the channel response estimate for the uplink channel,
$\hat{\underline{K}}_{ap}$ is a matrix for the correction factors for the second station,
$\hat{\underline{K}}_{ut}$ is a matrix for the correction factors for the first station, and
"$T$" denotes a transpose.

5. The method of claim 4, further comprising:
   deriving correction factors for a transmit side of the second station and correction factors for a receive side of the second station based on the following equation:

$$\hat{\underline{K}}_{ap} = \hat{\underline{K}}_{tap}\hat{\underline{K}}_{rap}^{-1},$$

where $\hat{\underline{K}}_{tap}$ is a matrix for the correction factors for the transmit side of the second station, and
$\hat{\underline{K}}_{rap}$ is a matrix for the correction factors for the receive side of the second station.

6. The method of claim 5, further comprising:
   setting the matrix $\hat{\underline{K}}_{tap}$ or the matrix $\hat{\underline{K}}_{rap}$ to an identity matrix.

7. The method of claim 5, further comprising:
   setting the matrix $\hat{\underline{K}}_{tap}$ or the matrix $\hat{\underline{K}}_{rap}$ to an arbitrary matrix.

8. The method of claim 4, further comprising:
   deriving correction factors for a transmit side of the first station and correction factors for a receive side of the first station based on the following equation:

$$\hat{\underline{K}}_{ut} = \hat{\underline{K}}_{tut}\hat{\underline{K}}_{rut}^{-1},$$

where $\hat{K}_{tut}$ is a matrix for the correction factors for the transmit side of the first station, and
$\hat{K}_{rut}$ is a matrix for the correction factors for the receive side of the first station.

9. The method of claim 4, wherein the determining the correction factors for the second station and the correction factors for the first station comprises
computing a matrix $C$ as an element-wise ratio of the matrix $\hat{H}_{up}$ over the matrix $\hat{H}_{dn}$, and
deriving the matrices $\hat{K}_{ap}$ and $\hat{K}_{ut}$ based on the matrix $C$.

10. The method of claim 9, wherein the deriving the matrix $\hat{K}_{ut}$ comprises
normalizing each of a plurality of rows of the matrix $C$,
determining a mean of the plurality of normalized rows of the matrix $C$, and
forming the matrix $\hat{K}_{ut}$ based on the mean of the plurality of normalized rows.

11. The method of claim 9, wherein the deriving the matrix $\hat{K}_{ap}$ comprises
normalizing each of a plurality of columns of the matrix $C$,
determining a mean of inverses of the plurality of normalized columns of the matrix $C$, and
forming the matrix $\hat{K}_{ap}$ based on the mean of the inverses of the plurality of normalized columns.

12. The method of claim 4, further comprising:
deriving the matrices $\hat{K}_{ap}$ and $\hat{K}_{at}$ based on minimum mean square error (MMSE) computation.

13. The method of claim 4, further comprising:
deriving the matrices $\hat{K}_{ap}$ and $\hat{K}_{ut}$ based on minimum mean square error (MMSE) computation to minimize a mean square error (MSE) given by the following equation $$|H_{up}K_{ut}-(H_{dn}K_{ap})^T|^2.$$

14. The method of claim 1, wherein the determining the correction factors for the second station and the correction factors for the first station comprises
deriving a first set of matrices of correction factors for the second station for a first set of frequency subbands, and
interpolating the first set of matrices to obtain a second set of matrices of correction factors for the second station for a second set of frequency subbands.

15. The method of claim 1, wherein the determining the correction factors for the second station and the correction factors for the first station comprises
deriving a first set of matrices of correction factors for the first station for a first set of frequency subbands, and
interpolating the first set of matrices to obtain a second set of matrices of correction factors for the first station for a second set of frequency subbands.

16. The method of claim 1, further comprising:
transmitting a pilot on the uplink channel, wherein the uplink channel response estimate is derived based on the pilot transmitted on the uplink channel; and
receiving a pilot on the downlink channel, wherein the downlink channel response estimate is derived based on the pilot received on the downlink channel.

17. An apparatus in a wireless time division duplexed (TDD) communication system, comprising:
means for deriving a channel response estimate for a downlink channel from a second station to a first station;
means for receiving, from the second station, a channel response estimate for an uplink channel from the first station to the second station; and
means for determining correction factors for the second station and correction factors for the first station based on the channel response estimates for the downlink and uplink channels, the correction factors for the second station and the correction factors for the first station being used to obtain a calibrated downlink channel response and a calibrated uplink channel response.

18. The apparatus of claim 17, wherein the first station comprises an access point, the apparatus further comprising:
means for applying the correction factors for the access point on a transmit side, or a receive side, or both the transmit and receive sides at the access point.

19. The apparatus of claim 17, wherein the first station comprises an access point, the apparatus further comprising:
means for deriving correction factors for a transmit side of the access point and correction factors for a receive side of the access point based on the correction factors for the access point.

20. The apparatus of claim 17, wherein the first station comprises a user terminal, the apparatus further comprising:
means for applying the correction factors for the user terminal on a transmit side, or a receive side, or both the transmit and receive sides at the user terminal.

21. The apparatus of claim 17, wherein the first station comprises a user terminal, the apparatus further comprising:
means for deriving correction factors for a transmit side of the user terminal and correction factors for a receive side of the user terminal based on the correction factors for the user terminal.

22. The apparatus of claim 17, wherein the means for determining the correction factors for the second station and the correction factors for the first station comprises
means for performing minimum mean square error (MMSE) computation on the channel response estimates for the downlink and uplink channels to determine the correction factors for the second station and the correction factors for the first station.

23. The apparatus of claim 17, wherein the means for determining the correction factors for the second station and the correction factors for the first station comprises
means for performing matrix ratio computation on the channel response estimates for the downlink and uplink channels to determine the correction factors for the second station and the correction factors for the first station.

24. A method of calibrating communication links in a wireless time division duplexed (TDD) multiple-input multiple-output (MIMO) communication system, comprising:
transmitting a pilot on a first communication link from a first station to a second station;
obtaining a channel response estimate for the first communication link derived based on the pilot transmitted on the first communication link;
receiving a pilot on a second communication link from the second station;
deriving a channel response estimate for the second communication link based on the pilot received on the second communication link; and
determining correction factors for the first station and correction factors for the second station based on the channel response estimates for the first and second communication links, the correction factors for the first station and the correction factors for the second station being used to obtain a calibrated channel response for the first communication link and a calibrated channel response for the second communication link.

25. The method of claim 24, further comprising:
applying the correction factors for the first station on a transmit side, or a receive side, or both the transmit and receive sides at the first station.

26. The method of claim 24, further comprising:
sending the correction factors for the second station to the second station.

27. The method of claim 24, further comprising:
updating the correction factors for the first station based on calibration with a plurality of second stations.

28. An apparatus in a wireless time division duplexed (TDD) communication system, comprising:
a transmit spatial processor to transmit a first pilot on a first communication link from a first station to a second station;
a receive spatial processor to receive a second pilot on a second communication link from the second station, to derive a channel response estimate for the second communication link based on the received second pilot, and to receive a channel response estimate for the first communication link derived based on the transmitted first pilot; and
a controller to determine correction factors for the first station and correction factors for the second station based on the channel response estimates for the first and second communication links, the correction factors for the first station and the correction factors for the second station being used to obtain a calibrated channel response for the first communication link and a calibrated channel response for the second communication link.

29. The apparatus of claim 28, wherein the controller performs minimum mean square error (MMSE) computation on the channel response estimates for the first and second communication links to determine the correction factors for the first station and the correction factors for the second station.

30. The apparatus of claim 28, wherein the controller performs matrix-ratio computation on the channel response estimates for the first and second communication links to determine the correction factors for the first station and the correction factors for the second station.

31. The apparatus of claim 28, wherein the controller derives correction factors for the transmit spatial processor and correction factors for the receive spatial processor based on the correction factors for the first station.

32. The apparatus of claim 28, wherein the controller updates the correction factors for the first station based on calibration with a plurality of second stations.

33. A method of calibrating communication links in a wireless time division duplexed (TDD) communication system, comprising:
deriving a channel response estimate for a downlink channel from an access point to a user terminal;
receiving from the access point a channel response estimate for an uplink channel from the user terminal to the access point; and
determining first correction factors for the access point and second correction factors for the user terminal based on the channel response estimates for the downlink and uplink channels, the first correction factors and the second correction factors being used to obtain a calibrated downlink channel response and a calibrated uplink channel response,
wherein the first correction factors are different than the second correction factors.

* * * * *